(12) United States Patent
Ji

(10) Patent No.: US 11,757,759 B2
(45) Date of Patent: Sep. 12, 2023

(54) HOP LIMIT/TTL PROPAGATION MODE AWARE RELAYED MPLS/SRV6 TRACEROUTE

(71) Applicant: Ciena Corporation, Hanover, MD (US)

(72) Inventor: Xiang Ji, Ottawa (CA)

(73) Assignee: Ciena Corporation, Hanover, MD (US)

( * ) Notice: Subject to any disclaimer, the term of this patent is extended or adjusted under 35 U.S.C. 154(b) by 107 days.

(21) Appl. No.: 17/007,313

(22) Filed: Aug. 31, 2020

(65) Prior Publication Data

US 2022/0070085 A1 Mar. 3, 2022

(51) Int. Cl.
| | | |
|---|---|---|
| H04L 45/00 | (2022.01) | |
| H04L 45/50 | (2022.01) | |
| H04L 12/46 | (2006.01) | |
| H04L 69/22 | (2022.01) | |
| H04L 43/10 | (2022.01) | |
| H04L 45/02 | (2022.01) | |

(52) U.S. Cl.
CPC .......... *H04L 45/20* (2013.01); *H04L 12/4633* (2013.01); *H04L 43/10* (2013.01); *H04L 45/02* (2013.01); *H04L 45/50* (2013.01); *H04L 69/22* (2013.01)

(58) Field of Classification Search
CPC ...................................... H04L 45/20
See application file for complete search history.

(56) References Cited

U.S. PATENT DOCUMENTS

| | | | |
|---|---|---|---|
| 10,917,337 B1* | 2/2021 | Arora | H04L 45/20 |
| 2009/0259755 A1* | 10/2009 | Boucachard | H04L 12/4633 709/227 |
| 2010/0118711 A1* | 5/2010 | Cankaya | H04L 41/5016 370/252 |
| 2013/0022041 A1* | 1/2013 | Kini | H04L 12/66 370/389 |

(Continued)

OTHER PUBLICATIONS

P. Agarwal et al., Time To Live (TTL) Processing in Multi-Protocol Label Switching (MPLS) Networks, Network Working Group, Category: Standards Track, The Internet Society, Jan. 2003, pp. 1-10.

(Continued)

*Primary Examiner* — Jason E Mattis
(74) *Attorney, Agent, or Firm* — Baratta Law PLLC; Lawrence A. Baratta, Jr.

(57) ABSTRACT

Systems and methods include receiving a traceroute packet at a relay node; responding to the traceroute packet with a first data structure inside the traceroute packet that indicates a propagation mode at the node and an operation type performed at the node, receiving subsequent traceroute packets from the initiator node with a second data structure inside the subsequent traceroute packets with data used to indicate changes in a header of the subsequent traceroute packets, and forwarding the subsequent traceroute packets with the changes to the header based on the data. The systems and methods can include utilizing the first data structure to determine the changes in the header of the subsequent traceroute packets. This can be used in Multi- (Continued)

protocol Label Switching (MPLS), Segment Routing (SR), and Internet Protocol (IP), where a TTL/Hop Limit propagation is limited.

19 Claims, 25 Drawing Sheets

(56) References Cited

U.S. PATENT DOCUMENTS

| | | | | |
|---|---|---|---|---|
| 2015/0030026 | A1* | 1/2015 | Kumar | H04L 45/02 |
| | | | | 370/392 |
| 2018/0302294 | A1* | 10/2018 | Diancin | H04L 41/147 |
| 2021/0092037 | A1* | 3/2021 | Rathi | H04L 43/10 |
| 2021/0352000 | A1* | 11/2021 | Devaraj | H04L 45/20 |
| 2022/0294731 | A1* | 9/2022 | Lu | H04L 45/20 |
| 2023/0188463 | A1* | 6/2023 | Cheng | H04L 45/566 |
| | | | | 709/238 |

OTHER PUBLICATIONS

K. Kompella et al., Detecting Multi-Protocol Label Switched (MPLS) Data Plane Failures, Network Working Group, Category: Standards Track, The Internet Society, Feb. 2006, pp. 1-50.

N. Bahadur et al., Mechanism for Performing Label Switched Path Ping (LSP Ping) over MPLS Tunnels, Internet Engineering Task Force (IETF), Category: Standards Track, ISSN: 2070-1721, Nov. 2011, pp. 1-23.

K. Kompella et al., Detecting Multiprotocol Label Switched (MPLS) Data-Plane Failures, Internet Engineering Task Force (IETF), Category: Standards Track, ISSN: 2070-1721, Mar. 2017, pp. 1-78.

N. Kumar et al., Label Switched Path (LSP) Ping/Traceroute for Segment Routing (SR) IGP-Prefix and IGP-Adjacency Segment Identifiers (SIDs) with MPLS Data Planes, Internet Engineering Task Force (IETF), Category: Standards Track, ISSN: 2070-1721, Dec. 2017, pp. 1-25.

C. Filsfils et al., RFC 8754 IPv6 Segment Routing Header (SRH), Internet Engineering Task Force (IETF), Category: Standards Track, ISSN: 2070-1721, Mar. 2020, pp. 1-27.

* cited by examiner

HOP LIMIT/TTL PROPAGATION MODE AWARE RELAYED MPLS/SRV6 TRACEROUTE

FIELD OF THE DISCLOSURE

The present disclosure generally relates to networking. More particularly, the present disclosure relates to systems and methods for Hop Limit/Time to Live (TTL) propagation mode aware relayed Multiprotocol Label Switching (MPLS)/Segment Routing over Internet Protocol version 6 data plane (SRv6) traceroute.

BACKGROUND OF THE DISCLOSURE

In Multiprotocol Label Switching (MPLS), there is a uniform mode and a pipe mode, and these are described in detail in RFC 3443, "Time To Live (TTL) Processing in Multi-Protocol Label Switching (MPLS) Networks," January 2003, the contents of which are incorporated by reference in their entirety. In the uniform mode, all nodes that a Label Switched Path (LSP) traverses are visible to nodes outside the LSP tunnel. Conversely, the pipe mode acts like a circuit, and only the LSP ingress and egress points are visible outside of the LSP tunnel. MPLS routers may operate in uniform mode (with TTL propagation) or pipe/short pipe mode (without TTL propagation), as described in RFC 3443. An MPLS network may have routers operate in both modes, and it is up to the operators to configure the network properly. This is prone to problems, such as when MPLS tunnels, including Segment Routing policies, binding Segment Identifiers (SIDs) are configured in the network, if the tunnel head end and tail end route operate in different mode, MPLS traffic problems can happen due to TTL propagation problems.

MPLS traceroute diagnosis tools were developed based on MPLS LSP standards RFC 4379, RFC 6424, RFC 8029, and RFC 8287, each of which is incorporated by reference in their entirety. These approaches are unable to function well in this situation, namely having routers in different modes or the pipe mode. For example, in RFC 4379, RFC 6424, and RFC 8029, the procedure is not able to trace into a tunnel which does not do TTL propagation.

RFC 8287, "Label Switched Path (LSP) Ping/Traceroute for Segment Routing (SR) IGP-Prefix and IGP-Adjacency Segment Identifiers (SIDs) with MPLS Data Plane," December 2017, tries to solve this problem with a recommendation which relies on a Forwarding Equivalence Class (FEC) stack change procedure; but this procedure has some major problems, and the value is very limited. The recommendation in RFC 8287 has major problems, including:

(A) the FEC stack change is control plane information; it does not represent data plane state, when the network is in a problem state, this information cannot be trusted for data plane forwarding decisions.

(B) the FEC stack change does not provide TTL propagation information at all; the operator has to assume that all the routes in the whole network are operating without TTL propagation (MPLS pipe mode/short pipe mode), this is not always true, such as in a really big network, routes may mix with different models, different versions and different vendors, and TTL propagation mode can be different among all the routers.

(C) The operator must know the MPLS operation mode first before executing the traceroute command to make it work, and the traceroute tool lack of capability to detect the real operation mode.

Also, the same issues arise when encapsulating an Internet Protocol (IP)/IPv6 packet with another IP/IPv6 header or when entering or leaving a Segment Routing v6 (SRv6) segment, TTL propagation mode applies. Here, as well, a router may operate in uniform mode with TTL/Hop Limit propagation, or pipe/short pipe mode without TTL/Hop Limit propagation), this can typically happen when to encapsulate and decapsulate the packet. This is prone to the same problems described above, when Segment Routing policies, binding SIDs are configured in the network, if the segment head end and tail end router operate in different mode, traffic problem can happen. Internet Control Message Protocol (ICMP)/ICMPv6 based traceroute is a common network diagnostic tool for both IPv4 and IPv6. Also, ICMP/ICMPv6 based traceroute is unable to deal with SRv6 routers configured with different TTL propagation modes in the network.

Thus, different TTL propagation modes are problematic in both MPLS and SRv6 networks. This is a common issue for all network protocols and especially when using Segment Routing technology, where more than one transport label stack is very common, and binding SIDs are widely used as well.

BRIEF SUMMARY OF THE DISCLOSURE

The present disclosure relates to systems and methods for a Hop Limit/Time to Live (TTL) propagation mode aware relayed Multiprotocol Label Switching (MPLS)/Segment Routing over Internet Protocol version 6 data plane (SRv6) traceroute. Note, in this document, "TTL" and "Hop Limit" are used interchangeably and refer to TTL in an IPv4/MPLS Header and Hop Limit in IPv6 and Segment Routing Header (SRH) header that is defined in RFC 8754, "IPv6 Segment Routing Header (SRH)," March 2020, the contents of which are incorporated by reference in their entirety. The present disclosure includes a TTL propagation detection mechanism to track it along the MPLS forwarding path explicitly; this information can be presented to the operator as network diagnostic data. This includes relaying an MPLS echo request to allow tracing into a tunnel or nesting tunnels. Also, when a tunnel headend node needs to hide the whole tunnel to prevent traceroute inside, for security reasons, etc. explicitly, it still has the flexibility to do so, by a local configure to disable this feature, in order not to report TTL operation state to the traceroute initiator node. Note, the present disclosure is described with reference to MPLS and SRv6, but the processes described herein apply to IP/IPv6 encapsulation as well, such as IP-in-IP.

In an embodiment, a node in a network includes circuitry configured to receive a traceroute packet from an initiator node, respond to the traceroute packet with a first data structure inside the traceroute packet that indicates a propagation mode at the node and an operation type performed at the node, receive subsequent traceroute packets from the initiator node with a second data structure inside the subsequent traceroute packets with data used to indicate changes in a header of the subsequent traceroute packets, and forward the subsequent traceroute packets with the changes to the header based on the data. The propagation mode can be one of a uniform mode, a pipe mode, and a short pipe mode, and wherein the operation type can be one of pop and push. The changes can include one of a change of a Time-to-Live (TTL) value in the header and a change of a Hop Limit value in the header. The data structure can be a Type-Length-Value (TLV). The network can utilize Multiprotocol Label Switching (MPLS), the changes are to Time-to-Live (TTL) value in the header, and the node is connected to a tunnel or segment in the network. The network can utilize Segment Routing (SR), the changes are to Hop Limit value in the header, and the node is connected to a portion of the network utilizing encapsulation and decapsulation. The network can utilize Internet Protocol (IP), the changes are to Hop Limit value in the header, and the node is connected to a portion of the network utilizing encapsulation and decapsulation.

In another embodiment, an initiator node in a network includes circuitry configured to: forward a traceroute packet to a relay node, receive a response to the traceroute packet with a first data structure inside the traceroute packet that indicates a propagation mode at the relay node and an operation type performed at the relay node, forward subsequent traceroute packets with a second data structure inside the subsequent traceroute packets with data used to indicate changes in a header of the subsequent traceroute packets, and receive a response to the subsequent traceroute packets with the changes to the header based on the data. The propagation mode can be one of a uniform mode, a pipe mode, and a short pipe mode, and wherein the operation type can be one of pop and push. The changes can include one of a change of a Time-to-Live (TTL) value in the header and a change of a Hop Limit value in the header. The data structure can be a Type-Length-Value (TLV). The network can utilize Multiprotocol Label Switching (MPLS), the changes are to Time-to-Live (TTL) value in the header, and the node is connected to a tunnel or segment in the network. The network can utilize Segment Routing (SR), the changes are to Hop Limit value in the header, and the node is connected to a portion of the network utilizing encapsulation and decapsulation. The network can utilize Internet Protocol (IP), the changes are to Hop Limit value in the header, and the node is connected to a portion of the network utilizing encapsulation and decapsulation.

In a further embodiment, a method implemented in a network includes receiving a traceroute packet at a relay node; responding to the traceroute packet with a first data structure inside the traceroute packet that indicates a propagation mode at the relay node and an operation type performed at the relay node, receiving subsequent traceroute packets with a second data structure inside the subsequent traceroute packets with data used to indicate changes in a header of the subsequent traceroute packets, and forwarding the subsequent traceroute packets with the changes to the header based on the data. The method can further include utilizing the first data structure to determine the changes in the header of the subsequent traceroute packets. The propagation mode can be one of a uniform mode, a pipe mode, and a short pipe mode, and wherein the operation type can be one of pop and push. The network can utilize Multiprotocol Label Switching (MPLS), the changes are to Time-to-Live (TTL) value in the header, and the relay node is connected to a tunnel or segment in the network. The network can utilize Segment Routing (SR), the changes are to Hop Limit value in the header, and the relay node is connected to a portion of the network utilizing encapsulation and decapsulation. The network can utilize Internet Protocol (IP), the changes are to Hop Limit value in the header, and the relay node is connected to a portion of the network utilizing encapsulation and decapsulation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a Hop Limit/Time to Live (TTL) propagation mode aware relayed Multiprotocol Label Switching (MPLS)/Segment Routing over Internet Protocol version 6 data plane (SRv6) traceroute. Note, in this document, "TTL" and "Hop Limit" are used interchangeably and refer to TTL in an IPv4/MPLS Header and Hop Limit in IPv6 and Segment Routing Header (SRH) header that is defined in RFC 8754, "IPv6 Segment Routing Header (SRH)," March 2020, the contents of which are incorporated by reference in their entirety. The present disclosure includes a TTL propagation detection mechanism to track it along the MPLS forwarding path explicitly; this information can be presented to the operator as network diagnostic data. This includes relaying an MPLS echo request to allow tracing into a tunnel or nesting tunnels. Also, when a tunnel headend node needs to hide the whole tunnel to prevent traceroute inside, for security reasons, etc. explicitly, it still has the flexibility to do so, by a local configure to disable this feature, in order not to report TTL operation state to the traceroute initiator node. Note, the present disclosure is described with reference to MPLS and SRv6, but the processes described herein apply to IP/IPv6 encapsulation as well, such as IP-in-IP.

For illustration purposes, the description utilizes MPLS as an example. However, the principals described herein work equally for IPv6 and SRv6 encapsulation and decapsulation as well. For SRv6, the following terminology mapping is needed in the following description:

TTL in MPLS→Hop Limit (HL) in SRv6;
New TTL operation Type-Length-Value (TLV) in MPLS echo packet→Header Length (HL) operation header as a new IPv6 extension header type;
New TTL relay TLV in MPLS echo packet→HL relay header as a new IPv6 extension header type;
Push label to enter a new tunnel/segment in MPLS→IPv6/SRv6 encapsulation; and
Pop label to leave a tunnel/segment in MPLS→IPv6/SRv6 decapsulation.

The following description of FIGS. 1-6 illustrates TTL propagation for background with uniform mode, pipe mode, and RFC 8287's recommendation.

Trace into a Tunnel and Beyond the Tunnel with TTL Propagation (Uniform Mode MPLS)

Figure 1:
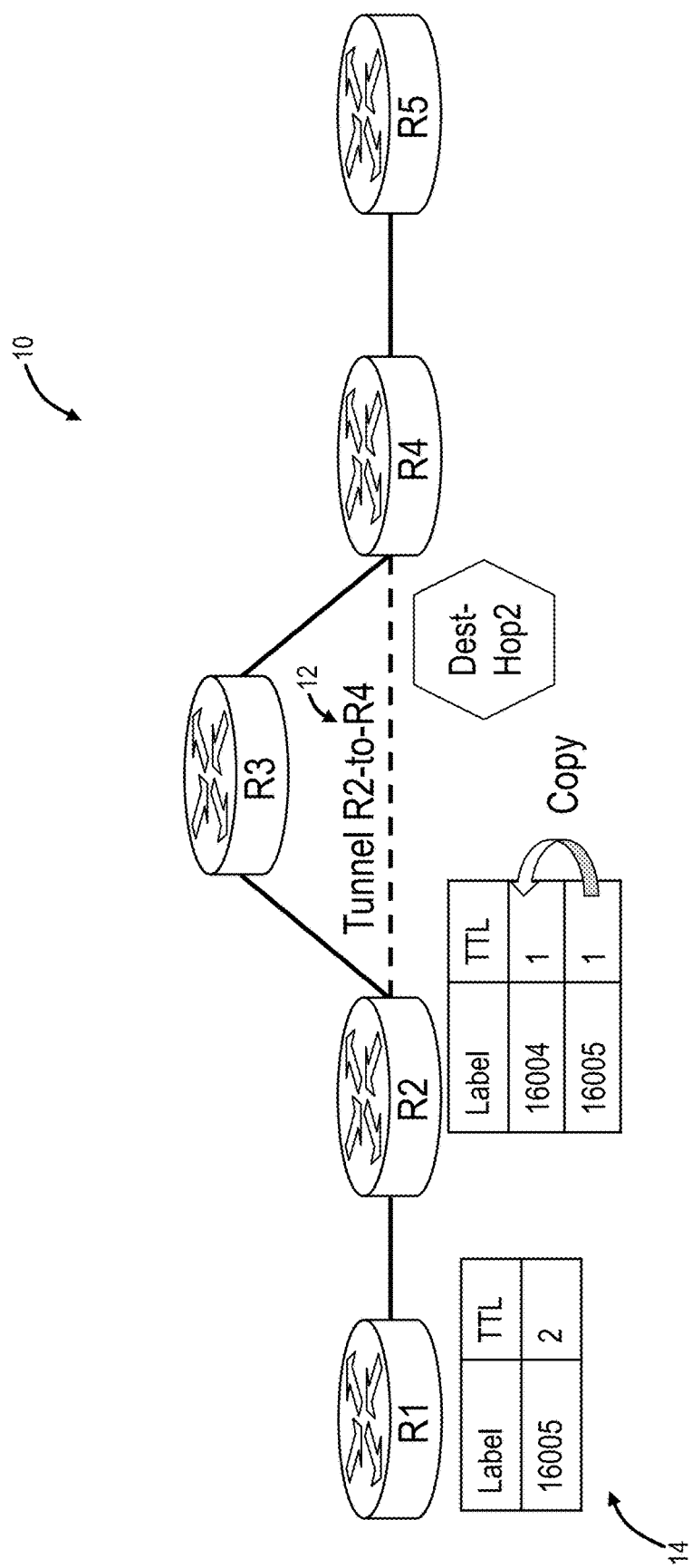
FIG. 1 is a network diagram of a network with five nodes R1-R5 for illustrating a trace into a tunnel with TTL propagation where the network is in uniform mode.

FIG. 1 is a network diagram of a network 10 with five nodes R1-R5 for illustrating a trace into a tunnel 12 with TTL propagation where the network 10 is in a uniform mode. In the various descriptions herein, the networks, including the network 10 can be MPLS, SRv6, IP, etc. The nodes can also be referred to as network elements, routers, switches, etc. For FIG. 1, as an example, to discover the second hop node R3, TTL=2 is used in an MPLS echo request message 14, which is referred to as a packet. The packet reaches node R2, and node R2 decreases the top label's TTL, copies it from the inner header to the pushed outer header. The packet reaches the node R3 and is provided to Operations, Administration, and Maintenance (OAM) for processing due to TTL expiry. Note, as described herein, the term "OAM" can be hardware, software, firmware, etc. that is configured to perform OAM functions, including responding to the packet. With this approach, the traceroute can stop at any hop by adjusting the initial TTL value.

Figure 2:
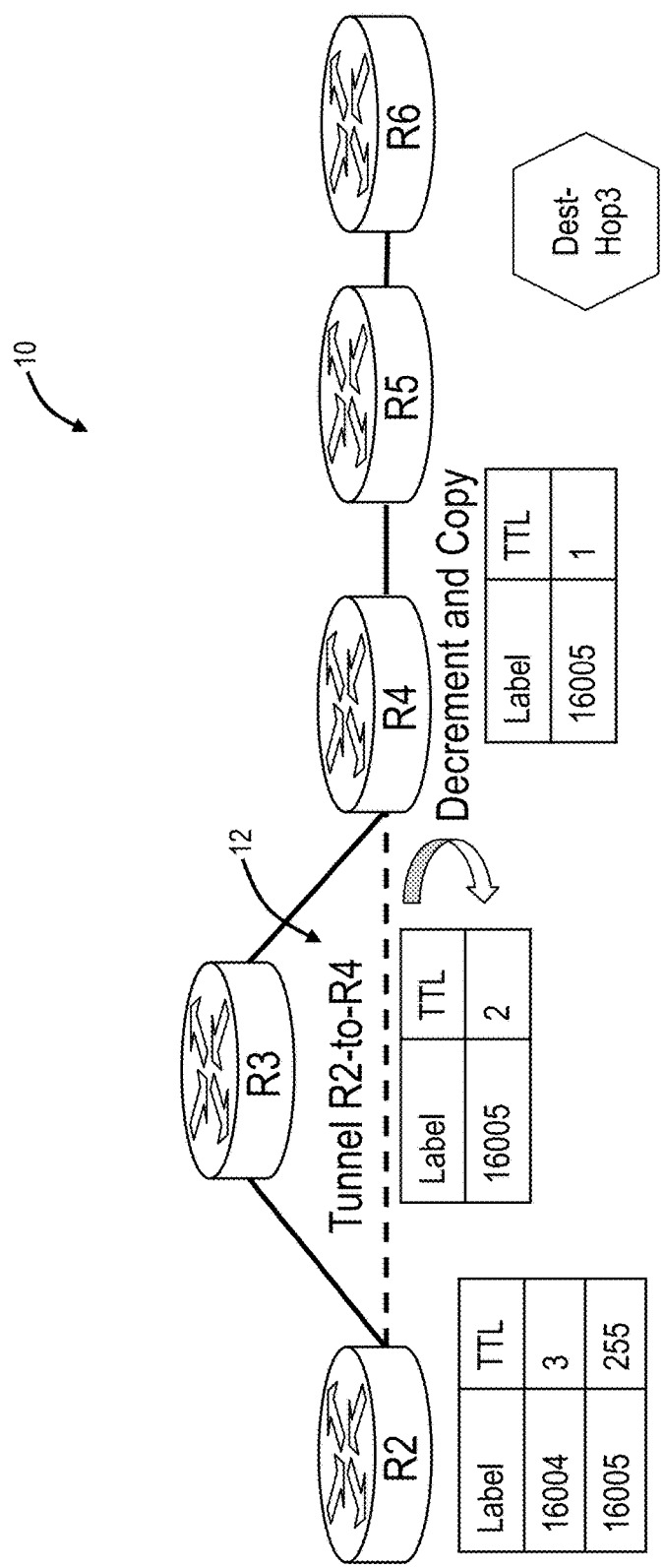
FIG. 2 is a network diagram of the network of FIG. 1 adding a node R6 after the tunnel for illustrating a trace beyond the tunnel with TTL propagation where the network is in a uniform mode.

FIG. 2 is a network diagram of the network 10 adding a node R6 after the tunnel for illustrating a trace beyond the tunnel 12 with TTL propagation where the network 10 is in a uniform mode. For FIG. 2, as another example, to discover the third hop node R5, TTL=3 is used for the top label in the MPLS echo request message. The packet reaches node R3, and node R3 decreases the top label's TTL, copies it to the inner header, and pops the outer header. The packet reaches node R4, and node R4 decreases the top label's TTL and continues forward. The packet reaches the node R5 and is provided to OAM for processing due to the TTL expiry. Again, the traceroute can stop at any hop by adjusting the initial TTL value.

Trace into the Tunnel and Beyond the Tunnel without TTL Propagation (Pipe Mode MPLS)

Figure 3:
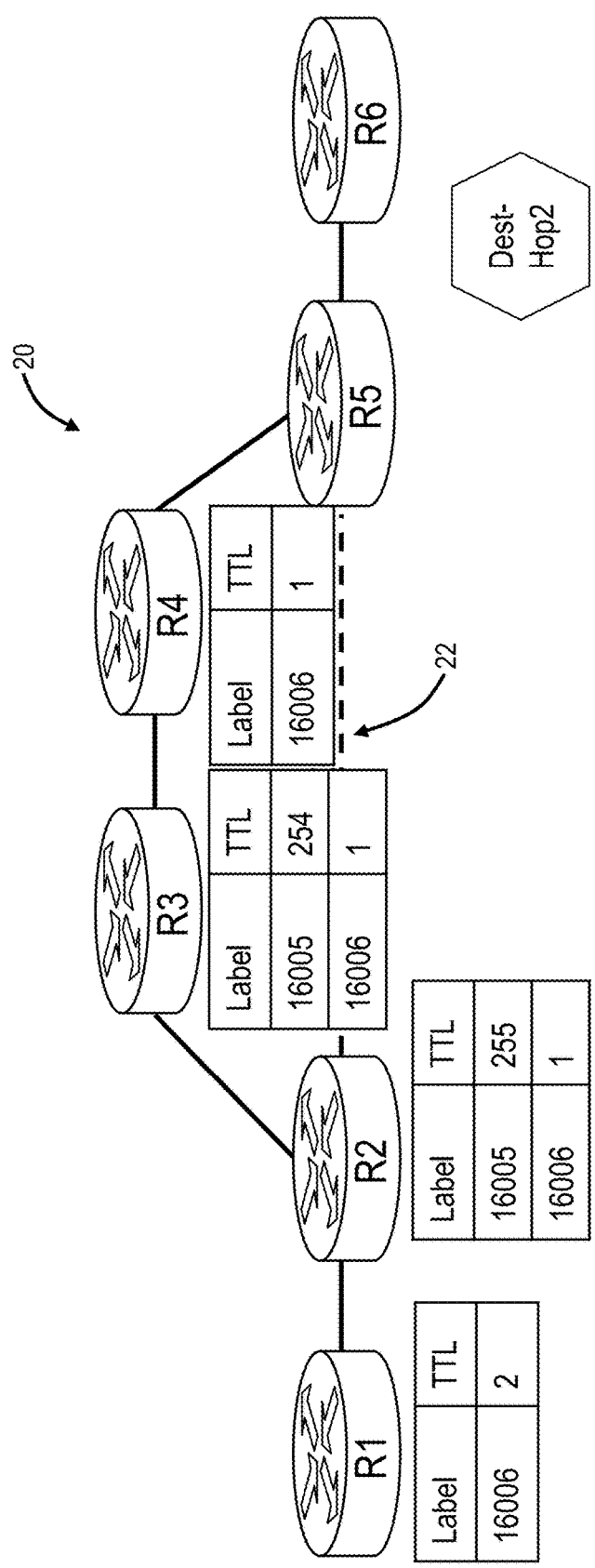
FIG. 3 is a network diagram of a network with six nodes R1-R6 for illustrating trace into a tunnel without TTL propagation where the network is in a pipe mode.

FIG. 3 is a network diagram of a network 20 with six nodes R1-R6 for illustrating trace into a tunnel 22 without TTL propagation where the network 20 is in a pipe mode. For FIG. 3, as an example, to discover the second hop node R3, TTL=2 is used in the MPLS echo request message. The packet reaches the node R2, and the node R2 decreases the top label's TTL, pushes a new outer header with a fixed TTL (255 for example, this depends on node R2's configuration). The packet reached the node R3, and the node R3 decreases the top label's TTL and continues forward, the node R3 is unable to provide the packet to OAM for the reply. The same applies to the node R4, and the node R4 pops the top label and continues forward. Eventually, the packet is provided to OAM for processing in the node R5 instead of the node R3, the whole tunnel 22 is treated as a single hop, and the traceroute cannot stop at a middle point of the tunnel 22 by adjusting the initial TTL value.

This is the expected behavior for when the configuration for TTL is in pipe mode; however, this is not always true, just because some platform does not support TTL propagation due to hardware limitation, and the router must run in MPLS uniform mode, the operator may still want the capability to trace into a tunnel, in this case, the traditional traceroute procedure does not work.

Figure 4:
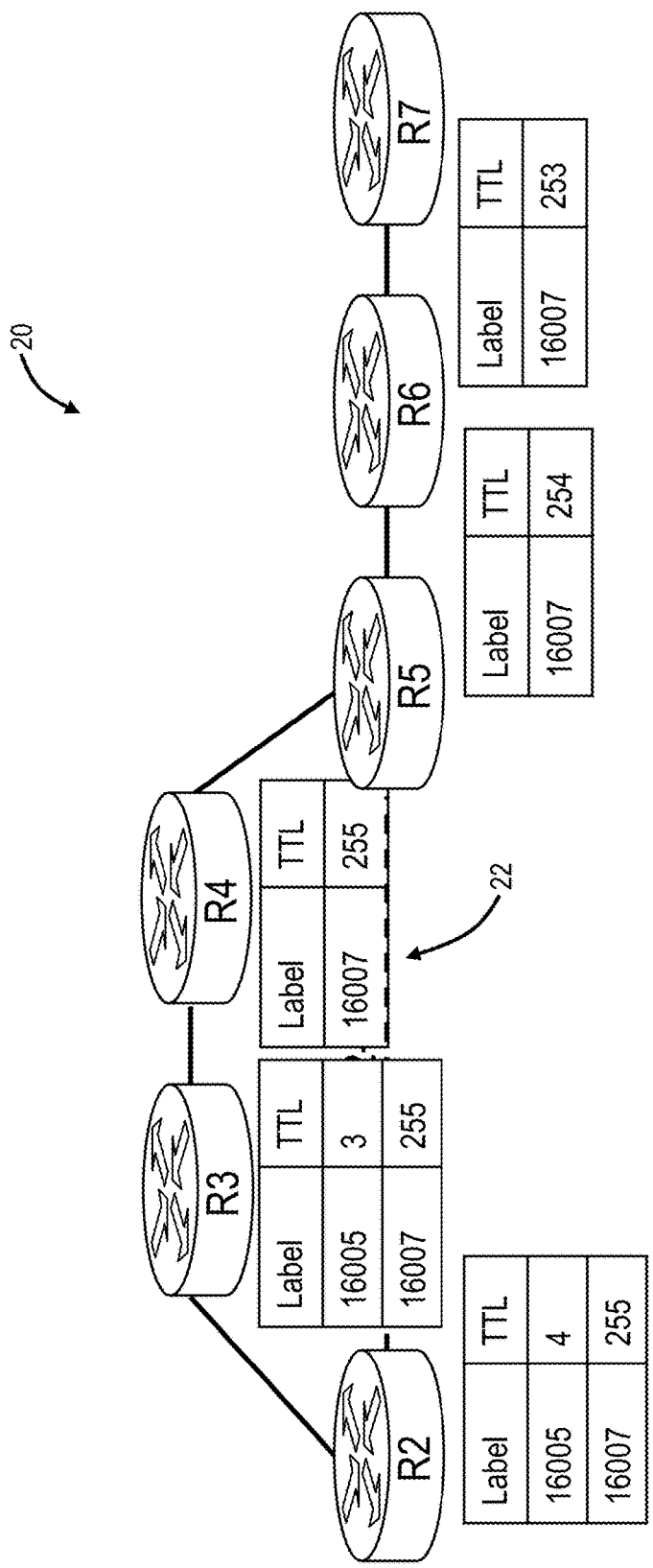
FIG. 4 is a network diagram of the network of FIG. 3 with an additional node R7 for illustrating a trace beyond the tunnel without TTL propagation where the network is in a pipe mode.

FIG. 4 is a network diagram of the network 20 with an additional node R7 for illustrating a trace beyond the tunnel 22 without TTL propagation where the network 20 is in a pipe mode. For FIG. 4, as an example, to discover the fourth hop node R6, TTL=4 is used for the top label in the MPLS echo request message. The packet reaches the node R3, and the node R3 decreases the top label's TTL to 3 and continues forward. The packet reaches the node R4, and the node R4 decreases the top label's TTL, pops the top label, and continues forward. The packet is forwarded all the way to egress node R7. By simply adjusting the top header's TTL value in the packet is not able to stop the packet at a given node beyond the tunnel endpoint, such as node R6.

RFC 8287 Recommendation

RFC 8287 tries to solve this problem with a recommendation that relies on an FEC stack change procedure, using control plane data to help adjust TTL in the whole label stack. This only solves the problem when a packet leaves a tunnel (pop segment), there is no solution to control a packet entering a tunnel (push segment). The FEC stack change does not provide TTL propagation information by itself and must assume that the operator knows the network TTL operation mode beforehand (implicitly referring to pipe mode). RFC 8287 assumes that all the routers (nodes) operate in the same TTL operation mode, that all the routers operate correctly for the TTL operation mode, and that the control plane FEC stack change information is correct. Accordingly, the operational value is very limited when using traceroute to diagnose real network issues.

Figure 5:
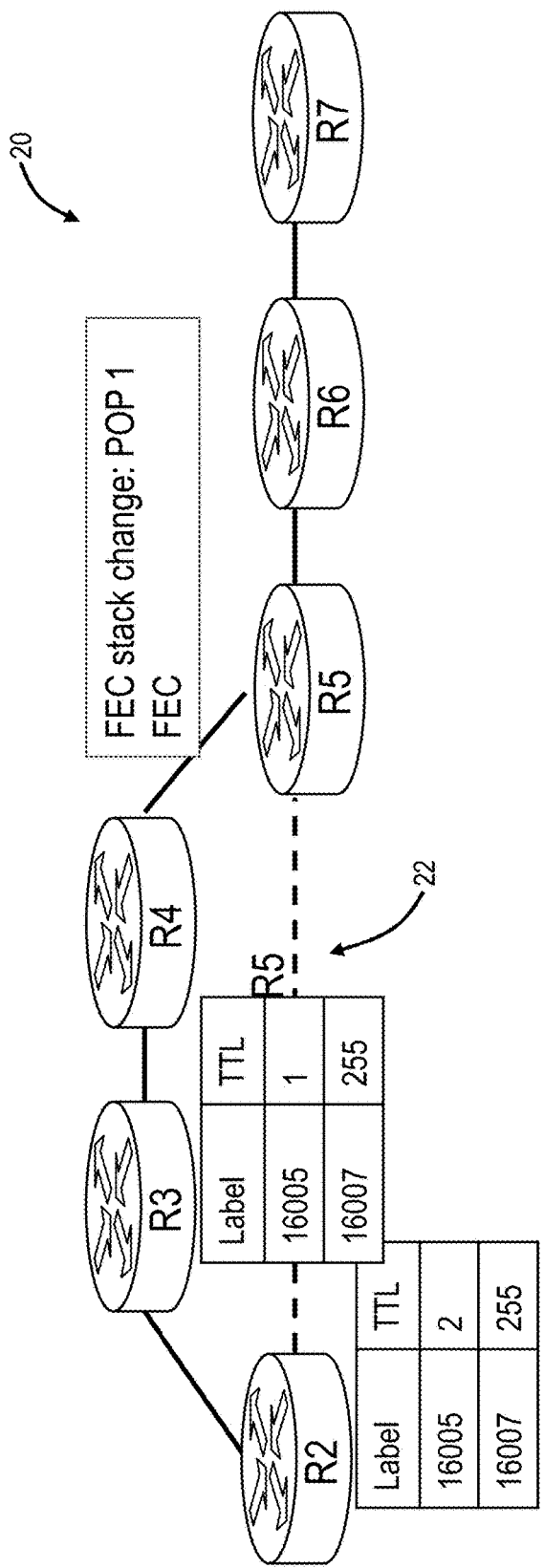
FIG. 5 is a network diagram of the network illustrating a trace beyond the tunnel without TTL propagation (pipe mode MPLS) using RFC 8287's recommendation.

FIG. 5 is a network diagram of the network 20 illustrating a trace beyond the tunnel 22 without TTL propagation (pipe mode MPLS) using RFC 8287's recommendation. As an example, to discover the third hop node R5, for simplification, FIG. 5 omits the first hop, and starts from the second hop at the node R2 with top header TTL=2; the node R3 forwards the packet to the node R4. The packet reaches the node R4, the node R4 replies to the node R2 with an FEC stack change of POP 1 FEC.

Figure 6:
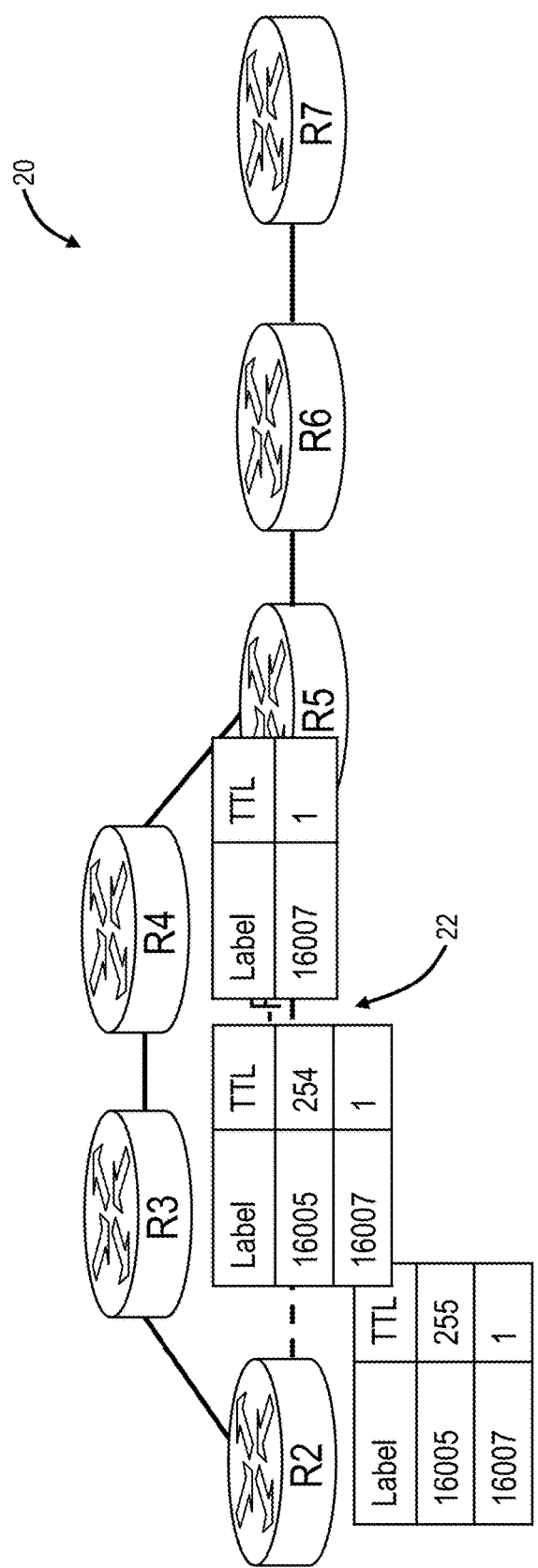
FIG. 6 is a network diagram of the network continuing the trace from FIG. 5 after the node R4.

FIG. 6 is a network diagram of the network continuing the trace from FIG. 5 after the node R4. The node R1 reacts to the FEC stack change, assumes that the TTL propagation is not performed on R4, R2 sets the current label depth TTL=255, start increasing the next segment's TTL from 1. The packet is forwarded to the node R5 via the nodes R3 and R4, and the node R5 provides the packet to OAM due to TTL expiry. With this procedure, traceroute can stop at any hop by adjusting the initial TTL value.

Hop Limit/TTL Propagation Mode Aware Traceroute

To address the limitations of the pipe mode and the limitations of operation in a network where the nodes may be configured in a mixture of uniform and pipe mode, the present disclosure includes a traceroute operation detecting the local TTL propagation mode for every router (node) along the forwarding path. The traceroute operation further relays the desired TTL adjustment information by middle nodes. The information to be relayed is encoded in the MPLS echo request, and MPLS echo response payload TLV (newly introduced herein). The headend node controls the TTL in the whole label stack all the time along the forwarding path by allowing the relay node to change the MPLS header using the relay information encoded in the TLV. Again, this same approach is applicable to both MPLS and SRv6, the SRv6 and MPLS terminology and implementation mapping as described above.

The benefits of this approach include no control plane FEC stack changes, enabling the detection of network issues caused by FEC stack change mismatch. This approach does not require all nodes in the network to operate in the same mode, allowing the traceroute an ability to detect the wrong TTL propagation configuration and forwarding errors. All the detected TTL propagation operating information is fed back to the headend node and can be displayed to the operator. Finally, this approach can be initialized from any node and can handle multiple layered hierarchy tunnel/segment models, including leaving multiple layers segment from one node.

Figure 7:
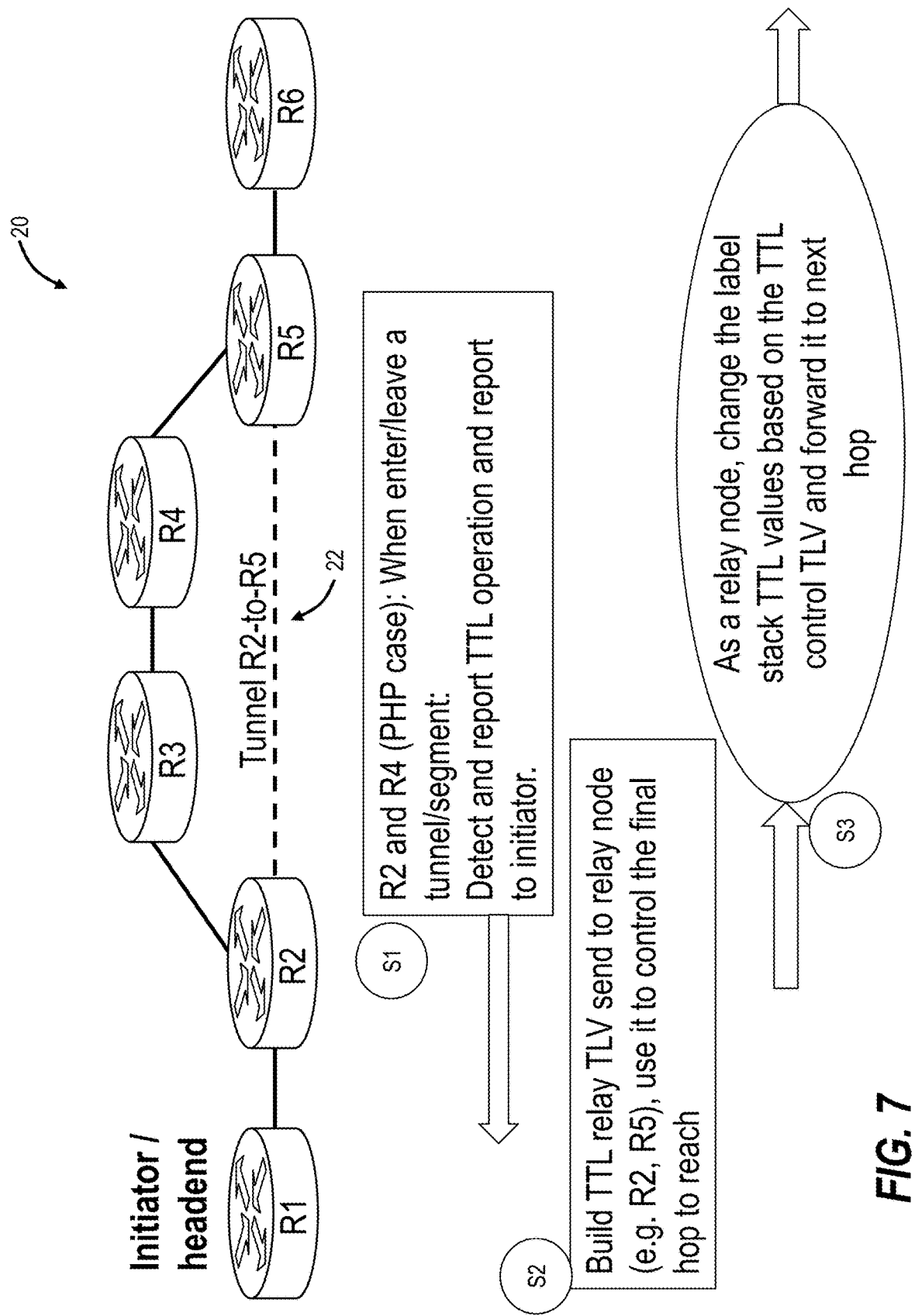
FIG. 7 is a network diagram of the network illustrating operation of the propagation mode aware traceroute.

FIG. 7 is a network diagram of the network 20 illustrating operations of the propagation mode aware traceroute. In this example, the node R1 is the initiator or headend node of a traceroute, and the tunnel 22 is between the nodes R2, R3, R4, R5 with the nodes R2, R5 being the tunnel 22 ingress and egress nodes. When a packet for a traceroute reaches a node which enters or leaves the tunnel 22, due to the packet TTL expiry, the node replies with a TTL operation type TLV (described in more detail herein) to the traceroute initiator (step S1). In this example, the nodes can be the node R2, the node R4 (for Penultimate Hop Popping (PHP), or the node R5. The key here is the detection and report of the TTL operation to the initiator, which can use the TLV information to build a TTL relay and to control the final hop to reach (step S2). The intermediate nodes, such as in the tunnel 22, can be relay nodes that can change the label stack TTL values based on the TTL control TLV and forward it to next hop (step S3).

Generally, the propagation mode aware traceroute utilizes a data structure, such as a TLV, and when a traceroute packet reaches a node, which enters or leaves a tunnel or segment, and due to the packet TTL expiry, the node replies with another data structure, e.g., a TLV, to the traceroute initiator. The initiator node may display the received TTL operation mode to a user interface, as well as storing and tracking the TTL operation locally for the traceroute path, based on the reply. For the next traceroute packet, the initiator node uses the same TTL value as the previous packet, but can append a Next-hop TTL value in the TTL relay TLV; the previous node is now treated as a relay node, and this packet will reach the relay node due to it uses the same MPLS header as the previous packet. That is, the present disclosure uses a TLV to relay traceroute information when nodes in a tunnel are configured in a pipe mode (without TTL propagation).

When the echo request packet reaches the relay node due to packet TTL expiry, the top item in the Next-hop TTL relay TLV is popped from the payload, and the value is used to modify the top label's TTL then inject the packet back to the data path and continue to forward the packet to the TTL value specified hop. The above relay process may happen multiple times on multiple nodes or the same node; each operation pops out one item in the Next-hop TTL relay TLV. When the packet reaches a node and no Next-hop TTL relay TLV left, this is the destination hop, and it replies with an MPLS echo reply packet. Also, multiple hierarchical relays are allowed. When a relay node receives a TTL relay TLV that does not match the local TTL operation status (e.g., uniform or pipe mode), a corresponding error return code shall be set in the echo reply message.

Traceroute is a problem isolation tool, not a connectivity validation tool. For connectivity, Ping can be used, and it uses the same protocol but operates differently, only sending a single packet per check.

MPLS Implementation

Each MPLS echo responding node detects local TTL operation mode and responds to the echo request initiator with data, including the local TTL operation mode. For example, this is illustrated in the node R2 in FIG. 9. The initiator is configured to send multiple traceroute packets. The MPLS echo initiator keeps track of the TTL operation mode for each hop in order of the label/TTL operation sequence; multiple operation modes can be stored in the stack to handle tunnel over tunnel scenarios, such as in FIGS. 17-23, including binding SID chain, after completely tracing an inner tunnel/segment in the middle of the forwarding route, the TTL operation mode for that tunnel/segment is removed.

When the trace is into or out of a tunnel/segment with nodes doing TTL propagation, no additional change is required. When the trace is into or out of a tunnel with nodes not doing TTL propagation, the MPLS echo initiator builds a next MPLS echo request with same TTL value as the previous echo request packet to the node, in the MPLS label stack header, to terminate the packet to that node due to TTL expiry, which pops labels or pushes new labels, and lets that node to relay the packet to the desired hop.

When completely tracing an inner tunnel/segment in the middle of the forwarding route, with corresponding TTL operation mode entry pops out from the stack, TTL for the outer segment starts increasing to trace into next hop. The MPLS echo relay is achieved by adding a TTL relay TLV in the payload of the MPLS echo request packet. The node relaying this packet uses this information from the payload to modify the TTL value in the label header and injects the packet back to the data path so that the packet can be forwarded to the desired hop specified by the TTL value.

The approach includes a new data structure, namely a TLV that is provided in an MPLS echo request/reply packet or a traceroute request/reply packet. As described herein, the nodes are configured to read/process this TLV in the payload. This enables TTL propagation regardless of operating mode. The following provides an implementation sample, and the format of data is just for explanation purposes, and it can be changed and renamed without impacting the functionality.

New TLV (Type, Length, Value) in MPLS echo reply packet: TTL operation type TLV that is sent from a node to an initiator. The operation types can include POP label with TTL propagation
POP label without TTL propagation
Push label with TTL propagation
Push label without TTL propagation New TLV in MPLS echo request packet: Next-hop TTL relay TLV that is sent by the initiator node, including a List of TTL value with optional label operation. The regular MPLS echo request/reply is used to start the traceroute procedure, and the TTL in top label increases by 1 to reach each hop in the packet forwarding path. When the packet reaches a node, which enters or leaves a tunnel/segment, due to packet TTL expiry, the node responds with the TTL operation type TLV to the traceroute initiator. The initiator may display the received TTL operation mode to a user interface.

For the next traceroute packet, the initiator uses the same TTL value as the previous packet and adds a Next-hop TTL relay TLV in the payload. When the echo request packet reaches the relay node and due to packet TTL expiry, the top item in the Next-hop TTL relay TLV is popped from the payload, and the value is used to modify the top label's TTL then the packet is injected back in the data path and continues to forward the packet to the TTL value specified hop. The above relay procedure may happen multiple times; each pops out one item in the Next-hop TTL relay TLV. When the packet reaches a node and no Next-hop TTL relay TLV left in the payload, this is the destination hop, and it replies with an MPLS echo reply packet.

SRv6 Implementation

The same steps apply to SRv6, substituting Hop Limit for TTL. Each traceroute responding node detects a local Hop Limit operation mode and replies to the traceroute initiator, including the local Hop Limit operation mode. The initiator keeps track of the Hop Limit operation mode for each hop in order of the encapsulate and decapsulate operation sequence; multiple operation modes can be stored in the stack to handle tunnel over tunnel scenarios, including a binding SID chain after completely tracing an inner tunnel/segment in the middle of the forwarding route, the Hop Limit operation mode for that tunnel/segment is removed.

When tracing in or out of a tunnel with nodes doing Hop Limit propagation, no additional change is required. When tracing in or out of a tunnel with nodes not doing Hop Limit propagation, the initiator builds next traceroute request packet with the same Hop Limit value as the previous echo request packet to the node in the IP/IPv6 header and Segment Routing v6 extension header (SRH) to terminate the packet to the node, which pops SID or pushes new SIDs due to Hop Limit exceed, and let that node to relay the packet to the desired hop. When completely tracing an inner tunnel/segment in the middle of the forwarding route, with the corresponding Hop Limit operation mode entry pops out from the stack, Hop Limit for the outer segment starts increasing to trace into next hop. The traceroute request packet relay is achieved by adding the Hop Limit operation stack in the payload of the packet. The node relaying this packet uses this information from the payload to modify the Hop Limit value in the IP/IPv6 header and Segment Routing Extension Header (SRH) for forwarding to the desired hop specified by the Hop Limit value.

Similar to the MPLS TTL example above, the following provides an implementation sample, and the format of data is just for explanation purposes, and it can be changed, and renamed without impacting the functionality. In this example, a User Datagram Protocol (UDP) packet is used for the traceroute, the Hop Limit handling related information is encoded as TLV in the packet payload, but this is only one form of implementation, this information can also be put into a new IPv6 extension header as well when using IPv6 extension header to store this information, the packet does not have to be UDP, any legacy traceroute packet can be supported including ICMPv6 echo request/reply.

The UDP packet format with user-defined data can be selected for traceroute request/reply packet with a new TLV in traceroute reply packet: Hop Limit operation type TLV. The operation types can include POP label with Hop Limit propagation
POP label without Hop Limit propagation
Push label with Hop Limit propagation
Push label without Hop Limit propagation New TLV in traceroute request packet: Next-hop Hop Limit relay TLV.

A list of TTL values with optional encapsulation/decapsulation operation Regular traceroute request/reply is used to start the traceroute procedure, Hop Limit in the outmost IP/IPv6 header increases by 1 to reach each hop in the packet forwarding path.

When the packet reaches a node, which enters or leaves a tunnel/segment, due to packet Hop Limit exceed, the node responds with the Hop Limit operation type TLV to the traceroute initiator. The initiator may display the received Hop Limit operation mode to the user interface. For the next traceroute packet, the initiator uses the same Hop Limit value as the previous packet and adds Next-hop Hop Limit relay TLV in the payload. When the traceroute request packet reaches the relay node due to packet Hop Limit expiry, the top item in the Next-hop Hop Limit relay TLV is popped from the payload, and the value is used to modify the top label's Hop Limit then inject the packet back to the data path and to forward the packet to the Hop Limit value specified hop. The above relay procedure may happen multiple times; each pops out one item in the Next-hop Hop Limit relay TLV. When the packet reaches a node and no Next-hop Hop Limit relay TLV left in the payload, this is the destination hop, and it replies with a traceroute reply packet.

Figure 8:
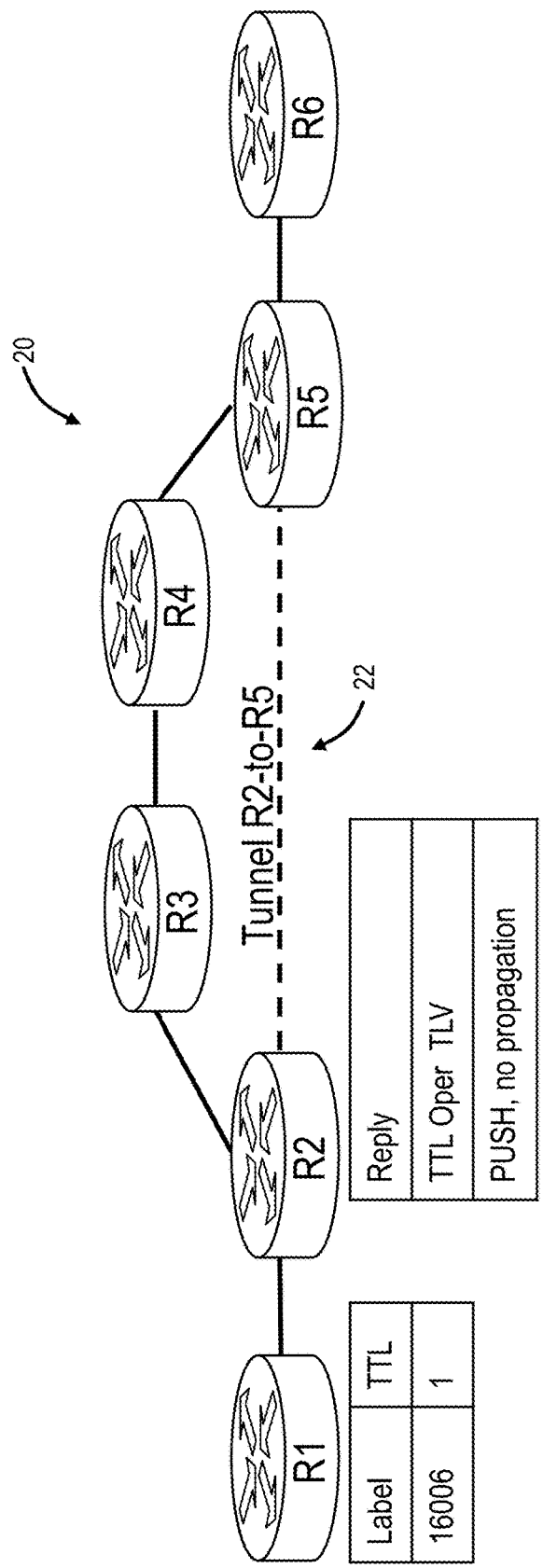
FIGS. 8-11 are network diagrams of the network illustrating a trace into the tunnel without TTL propagation (pipe mode MPLS) using the propagation mode aware traceroute.

Example Operation—Trace into the Tunnel without TTL Propagation Using Propagation Mode Aware Traceroute FIGS. 8-11 are network diagrams of the network 20 illustrating a trace into the tunnel 22 without TTL propagation (pipe mode MPLS) using the propagation mode aware traceroute. Specifically, the example described in FIGS. 8-11 shows how to traceroute to the third hop node, namely the node R3, hop by hop, and where the node R3 is in the tunnel 22 that operates in the pipe mode. FIG. 8 illustrates the first-hop handling of the traceroute. In FIG. 8, the node R1 transmits an MPLS echo request packet with a top header TTL of 1. On receiving the packet at the node R2 and due to TTL expiry, the node R2 detects the label stack push without TTL propagation mode and reports this back to the node R1 in an echo reply message.

Figure 9:
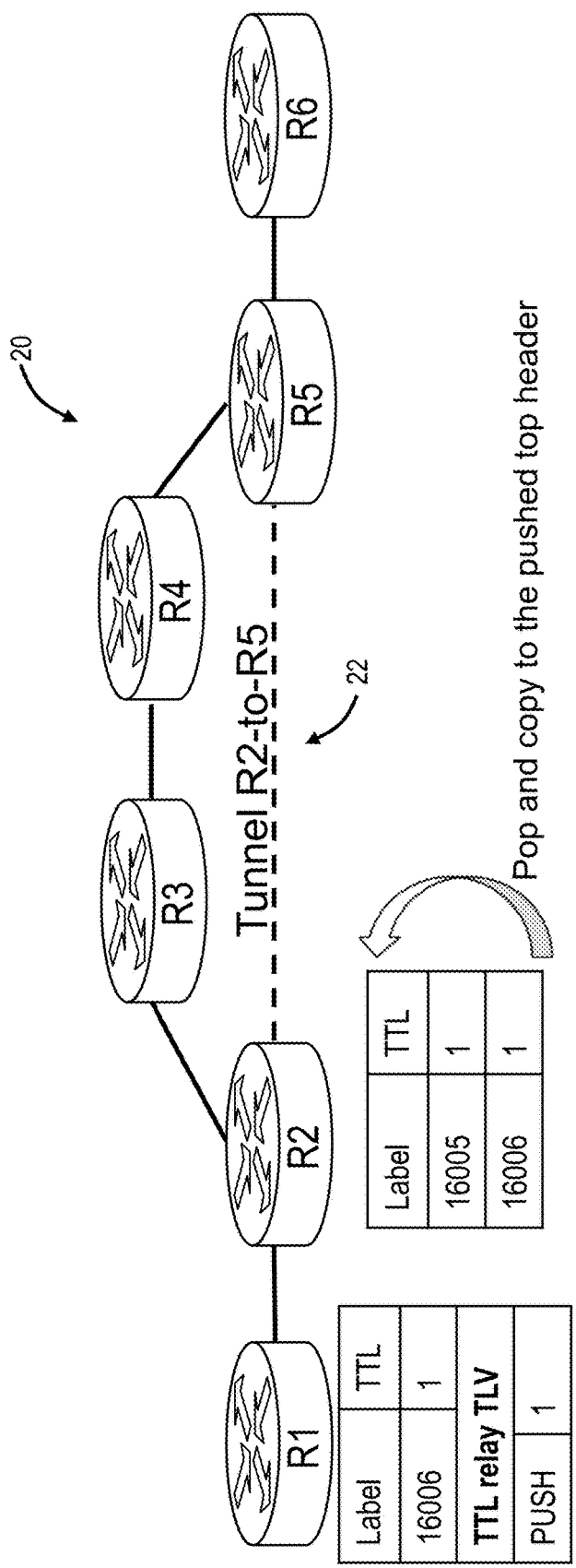

FIG. 9 illustrates the second hop handling of the traceroute where the node R2 relays an echo request packet to the node R3. In FIG. 9, on receiving the echo reply message with a TTL operation TLV, the node R1 builds a request packet for hop 2, keeping the TTL in the header with the same value of the previous hop as 1, adding a TTL relay TLV, the TTL relay value starts from 1 to reach the first hop beyond the relay node. The node R2 receives the packet due to TTL expiry, and the node R2 pops the TTL value from the TTL relay TLV, uses this value to build the pushed new label TTL (label 16005' TTL set to the popped TTL value), and does not decrease the received TTL (label 16006' TTL is kept as 1, or reset to a default number, e.g., 255). The node R2 transmits the packet back in the data path, so it is forwarded, this is the relay process. The node R3 receives the packet due to TTL expiry and replies to the node R1 (omitted from the diagram for simplification) to complete the processing of hop 2.

Figure 10:
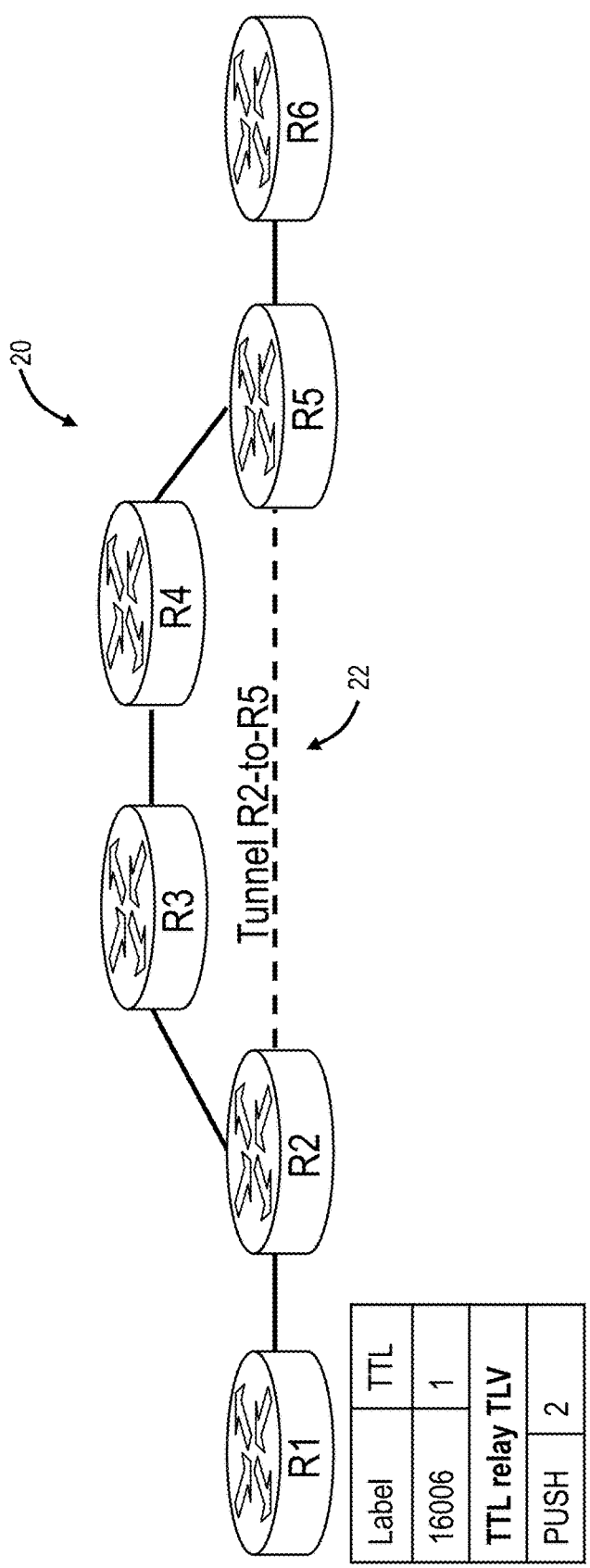
Figure 11:
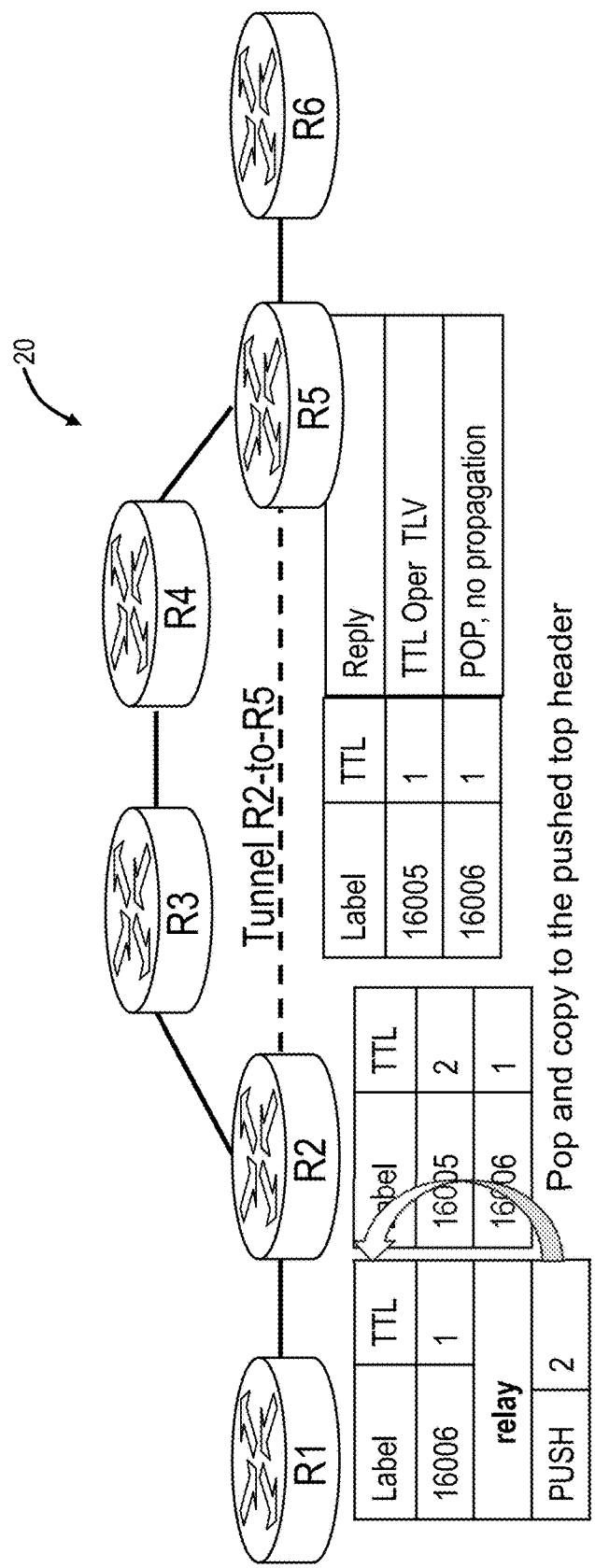

FIGS. 10-11 illustrate the third hop handling of the traceroute were the node R2 relays the echo request packet to the node R4. The node R1 builds a request packet for hop 3, keeping the TTL in the header with the same value of the previous hop as 1, the TTL relay TLV value increases to 2 to reach the node R4, the second hop beyond the relay node R2. The node R2 receives the packet due to the TTL expiry. As a relay node, the node R2 pops the TTL value from the TTL relay TLV, uses this value to build the pushed new label TTL (label 16005' TTL set to the popped TTL value), and does not decrease the received TTL (label 16006' TTL keep as 1, or reset to a default number, e.g., 255). The node R2 puts the packet back in the data path and forward it. The node R3 transparently forwards the packet to node R4. The node R4 receives the packet due to TTL expiry and replies to the node R1, with a TTL operation TLV of the POP top label without TTL propagation. This information can be used to continue traceroute to next hops (not shown in the diagram), and this same procedure is repeated to continue for hop 4, hop 5, etc.

As is known in the art, a regular traceroute is a hop by hop operation with multiple packets. It starts from the first packet exchange using TTL 1 to reach the first hop, then increasing this value for packets to reach each downstream hops. In the example case of R1-R2-R3-R4, the first packet TTL is 1 to reach the node R2, the second is 2 to reach node R3, and the third packet TTL is 3 to reach node R4. But if the nodes are in a non TTL propagation supported tunnel, then the tunnel midpoint nodes are skipped, that is, if R2-R3-R4 uses a tunnel which does not support TTL propagation, the second packet TTL=2 makes the packet directly goes to the node R4 instead of node R3. In the relayed solution, TTL=1 is used to reach node R2 first then to let the node R2 relay the packet one hop further, by doing this, the node R1 can navigate the packet to the node R3.

Figure 12:
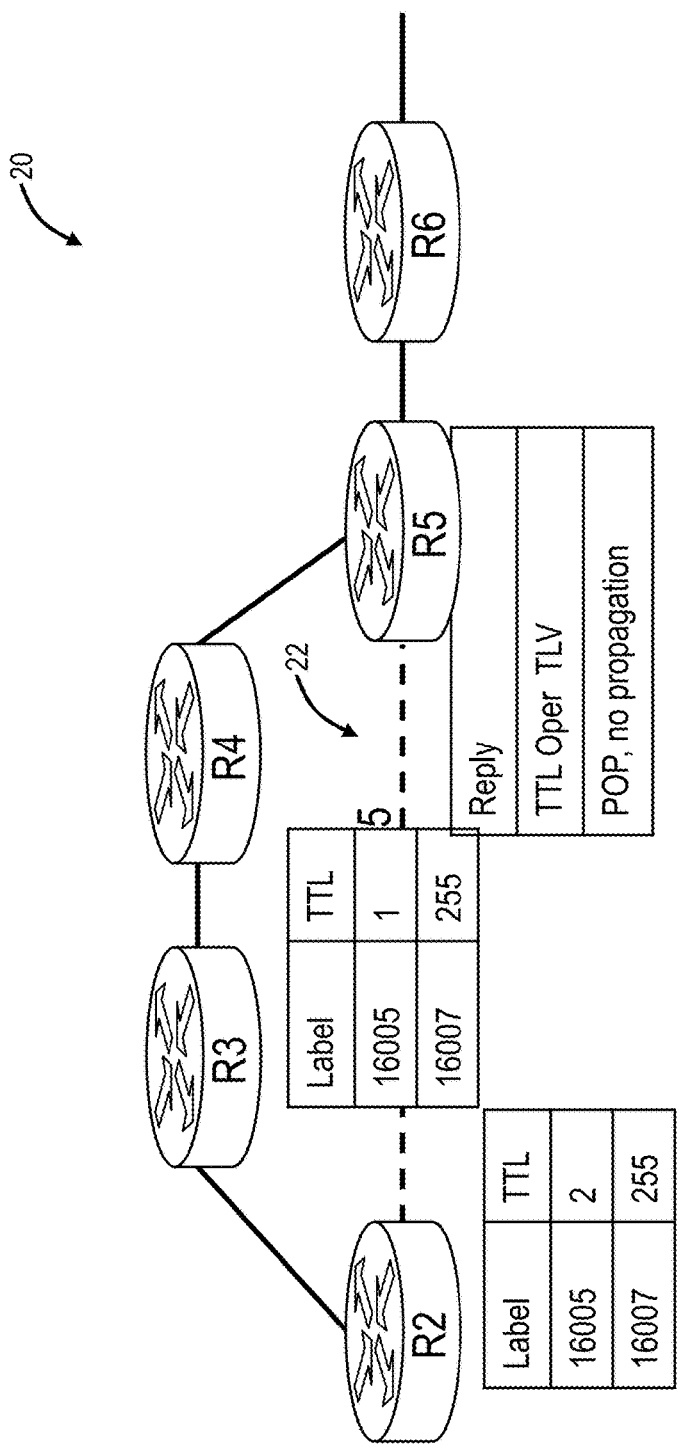
FIGS. 12-14 are network diagrams of the network illustrating a trace beyond the tunnel without TTL propagation (pipe mode MPLS) using the propagation mode aware traceroute.
Figure 13:
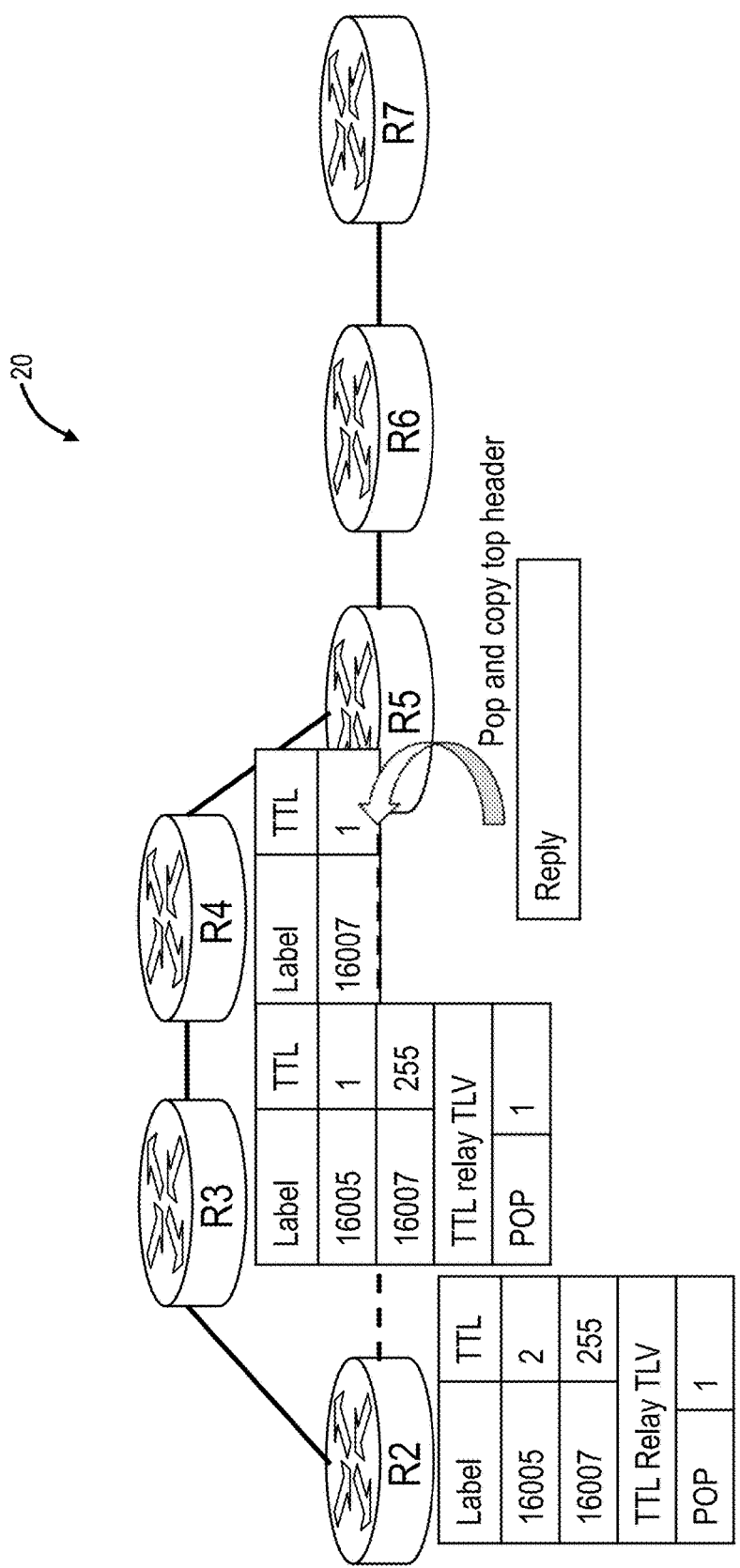
Figure 14:
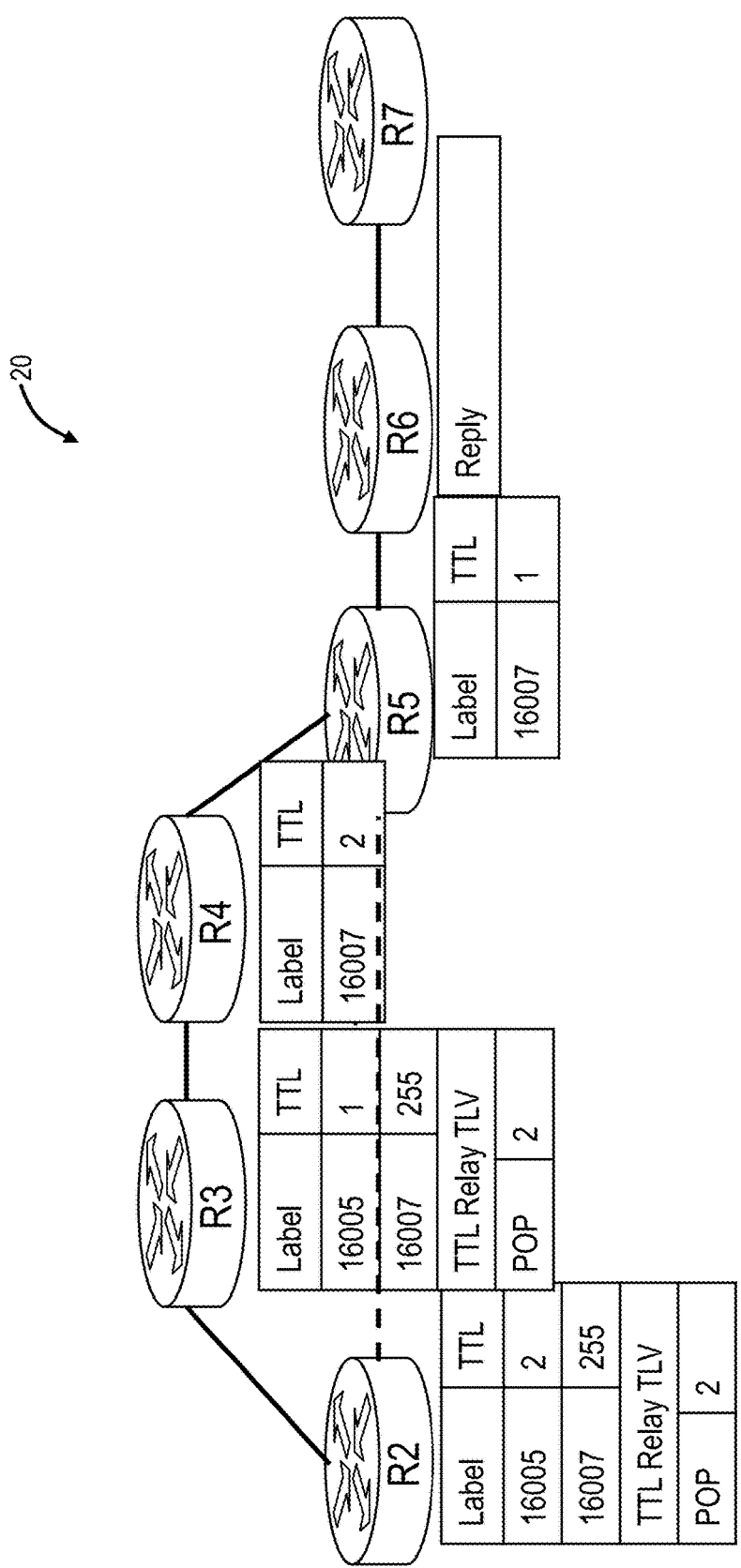

Example Operation—Trace Beyond the Tunnel without TTL Propagation Using Propagation Mode Aware Traceroute FIGS. 12-14 are network diagrams of the network 20 illustrating a trace beyond the tunnel 22 without TTL propagation (pipe mode MIMS) using the propagation mode aware traceroute. This example shows how to traceroute to the fourth hop node R4, which is beyond the endpoint of the tunnel 22. In FIG. 12. for illustration, the first hop is omitted as it requires no special handling. The node R2 builds an MIMS echo request packet with top header TTL=2 for hop 2. The node R3 transparently forwards the packet to the node R4. On receiving the packet due to TTL expiry, the node R4 detects a label stack push without TTL propagation mode and reports this back to node R1 in the echo reply message. The TTL operation mode detection and reporting are done only when the packet is provided to the OAM, and there is no TTL relay TLV in the received packet.

FIG. 13 illustrates the hop 3 handling. On receiving an echo reply with a TTL operation TLV, the node R2 builds a request packet for hop 3, keeps the TTL in the header with the same value of the previous hop as 2, adds a TTL relay TLV, the TTL relay value starts from 1 to reach the first hop beyond the relay node. The node R3 transparently forwards the packet to the node R4. On receiving the packet due to TTL expiry, the node R4 pops the TTL value from the TTL relay TLV, uses this value to build the new top label TTL after popping the tunnel label. Since the TTL relay TLV is present, which indicates that this is a transmit node for the packet, no detection is needed for the local TTL operation mode. The node R4 relays the packet by putting the modified packet to the data path to continue forward. The node R5 receives the packet due to TTL expiry and replies to the node R2.

FIG. 14 illustrates the hop 4 handling. The node R2 builds a request packet for hop 4, keeps the TTL in the header with the same value of the previous hop as 2, and increases the TTL relay TLV value to 2 to reach the second hop beyond the relay node. The node R3 transparently forwards the packet to the node R4. On receiving the packet due to TTL expiry, the node R4 pops the TTL value from the TTL relay TLV and uses this value to build the new top label TTL after pops the tunnel label. The node R4 relays the packet by putting the modified packet to the data path to continue forward. The node R5 transparently forwards the packet to the node R6. The node R6 receives the packet due to TTL expiry and replies to the node R2.

Figure 15:
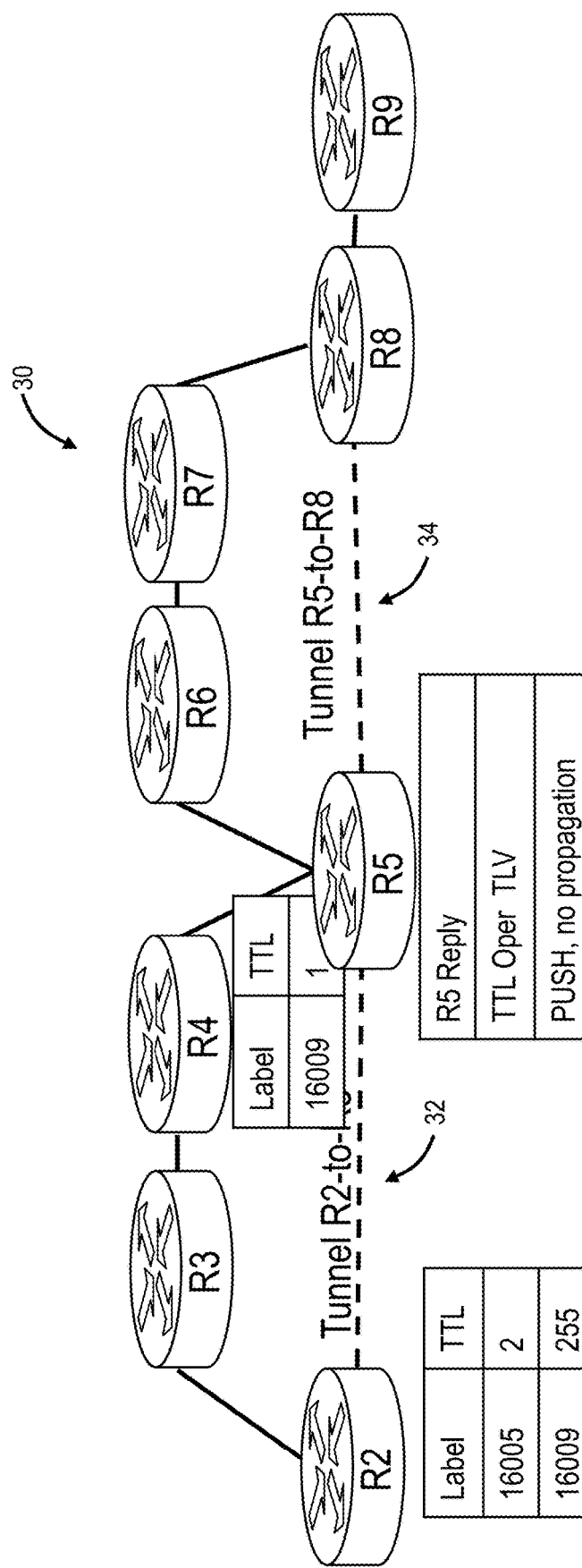
FIGS. 15-16 are network diagrams of a network illustrating a trace into a node, leave one tunnel, and enter another tunnel without TTL propagation using propagation mode aware traceroute.
Figure 16:
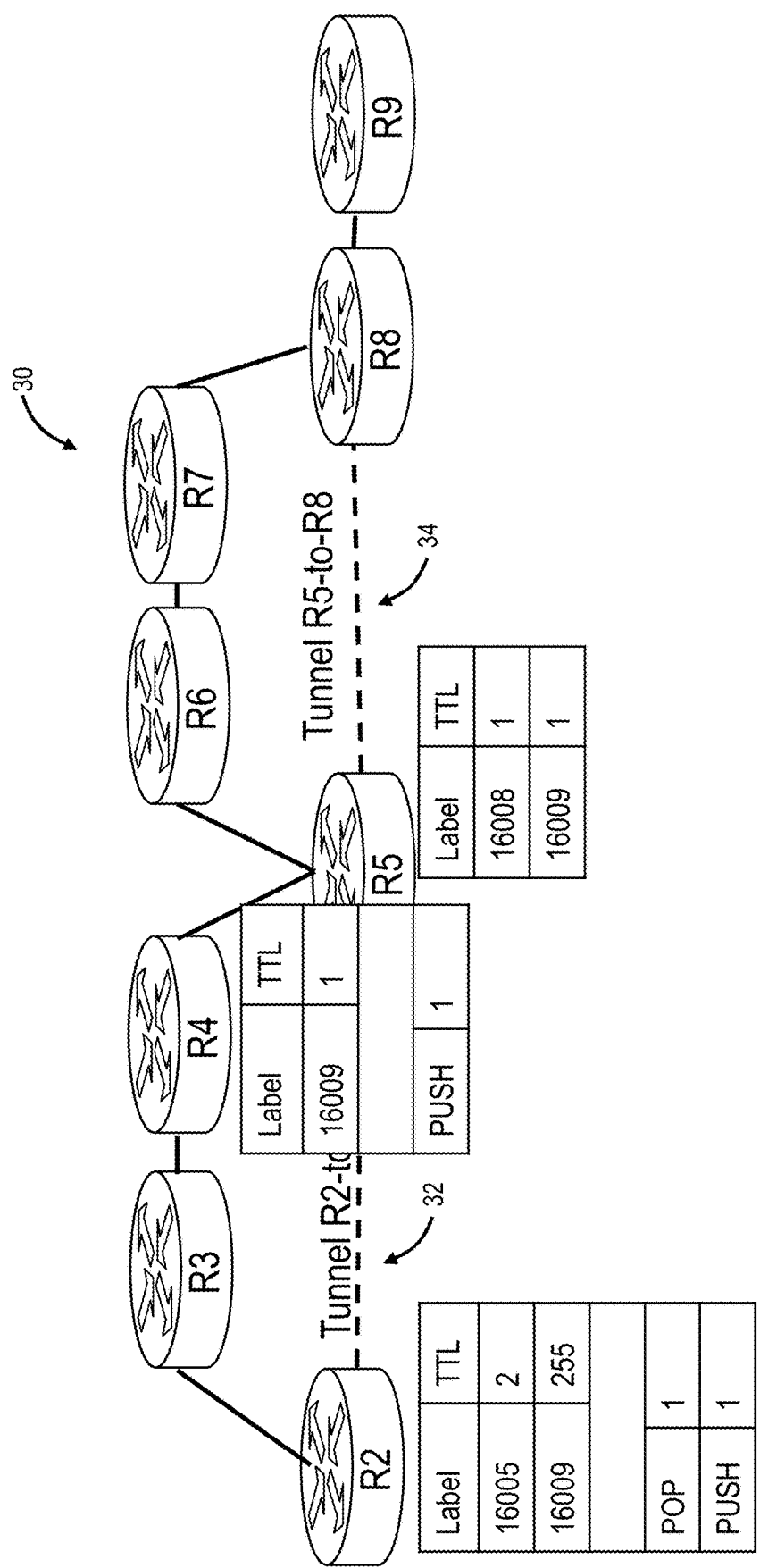

Example Operation—Trace into a Node, Leave One Tunnel, and Enter Another Tunnel without TTL Propagation Using Propagation Mode Aware Traceroute FIGS. 15-16 are network diagrams of a network 30 illustrating a trace into a node, leave one tunnel 32, and enter another tunnel 34 without TTL propagation using propagation mode aware traceroute. This example shows how to traceroute to the fourth hop node R6, where the node R4 is in the second tunnel segment. Most steps are the same to hop 3 handling in the previous example, and details are omitted to simplify the diagram.

In FIG. 15, on receiving the echo reply with the TTL operation TLV, the node R2 builds a request packet for hop 3, keeps the TTL in the header with the same value of the previous hop as 2, adds a TTL relay TLV, and the TTL relay value starts from 1 to reach the first hop beyond the relay node. The node R3 transparently forwards the packet to node R4. On receiving the packet due to TTL expiry, the node R4 pops TTL value from the TTL relay TLV, uses this value to build the new top label TTL after pops the tunnel label, detail see hop 3 handling in the previous example. The node R4 relays the packet by putting the modified packet back in the data path to continue forward. The node R5 receives the packet due to TTL expiry, detects local TTL operation mode as push without TTL propagation, and replies to the node R2 in TTL operation TLV.

FIG. 16 illustrates the hop 4 handling. The transmit node transparent forwarding behavior and relay node relay operations detail is the same as previously described and are omitted to simplify FIG. 16. The node R2 builds a request packet for hop 4, keeps the TTL in the header with the same value of the previous hop as 2, append the second TTL operation in the TTL relay TLV, value starts from 1 to reach the first hop beyond the second relay node. The node R3 transparently forwards the packet to the node R4 (omitted in FIG. 16). On receiving the packet due to TTL expiry, the node R4 pops one TTL value from the TTL relay TLV uses this value to build the new top label TTL after popping the tunnel label, and the detail is the same as hop 3. The node R4 relays the packet by putting the modified packet in the data path to continue forward. The node R5 receives the packet due to TTL expiry, pops the TTL value from the TTL relay TLV, and uses this value to build the new top label TTL after pushing the tunnel label. The node R6 receives the packet due to TTL expiry and replies to the node R2.

Example Operation—Trace into a Node Enters Two-Level Hierarchy Tunnels (or Segment Routing Policy with Multiple Labels) without TTL Propagation Using Propagation Mode Aware Traceroute FIGS. 17-23 are network diagrams of a network 40 illustrating a trace into a node enters two-level hierarchy tunnels (or segment routing policy with multiple labels) without TTL propagation using propagation mode aware traceroute. This example shows how to traceroute in a tunnel over tunnel case. This is a popular case for a Segment Routing network; a Segment Routing policy normally creates a label stack with multiple labels to forward the packet. The stacked label header can be viewed as multi-level hierarchy tunnels. In the network 40, the nodes R2 to R6 use hierarchy tunnels in a stack {R2-R5; R2-R6}.

Figure 17:
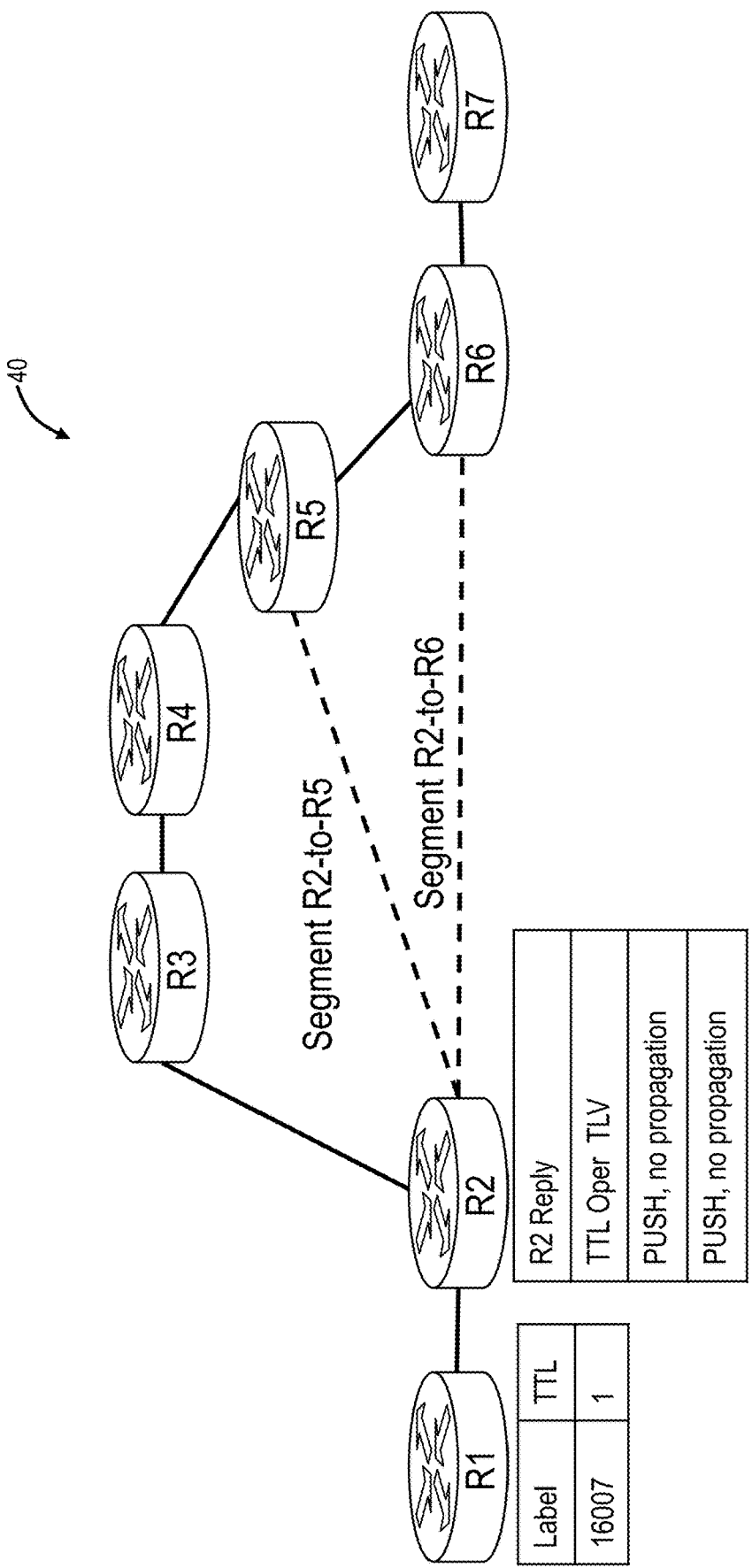
FIGS. 17-23 are network diagrams of a network illustrating a trace into a node enters two-level hierarchy tunnels (or segment routing policy with multiple labels) without TTL propagation using propagation mode aware traceroute.

FIG. 17 illustrates hop 1 handling. The node R1 builds an MPLS echo request packet with top header TTL start from 1. On receiving the packet due to TTL expiry, the node R2 detects label stack push two labels without TTL propagation mode and reports this back to the node R1 in the echo reply message, two items are present in the TLV, each corresponding to one level of tunnel operation, ordered by label operation sequence.

Figure 18:
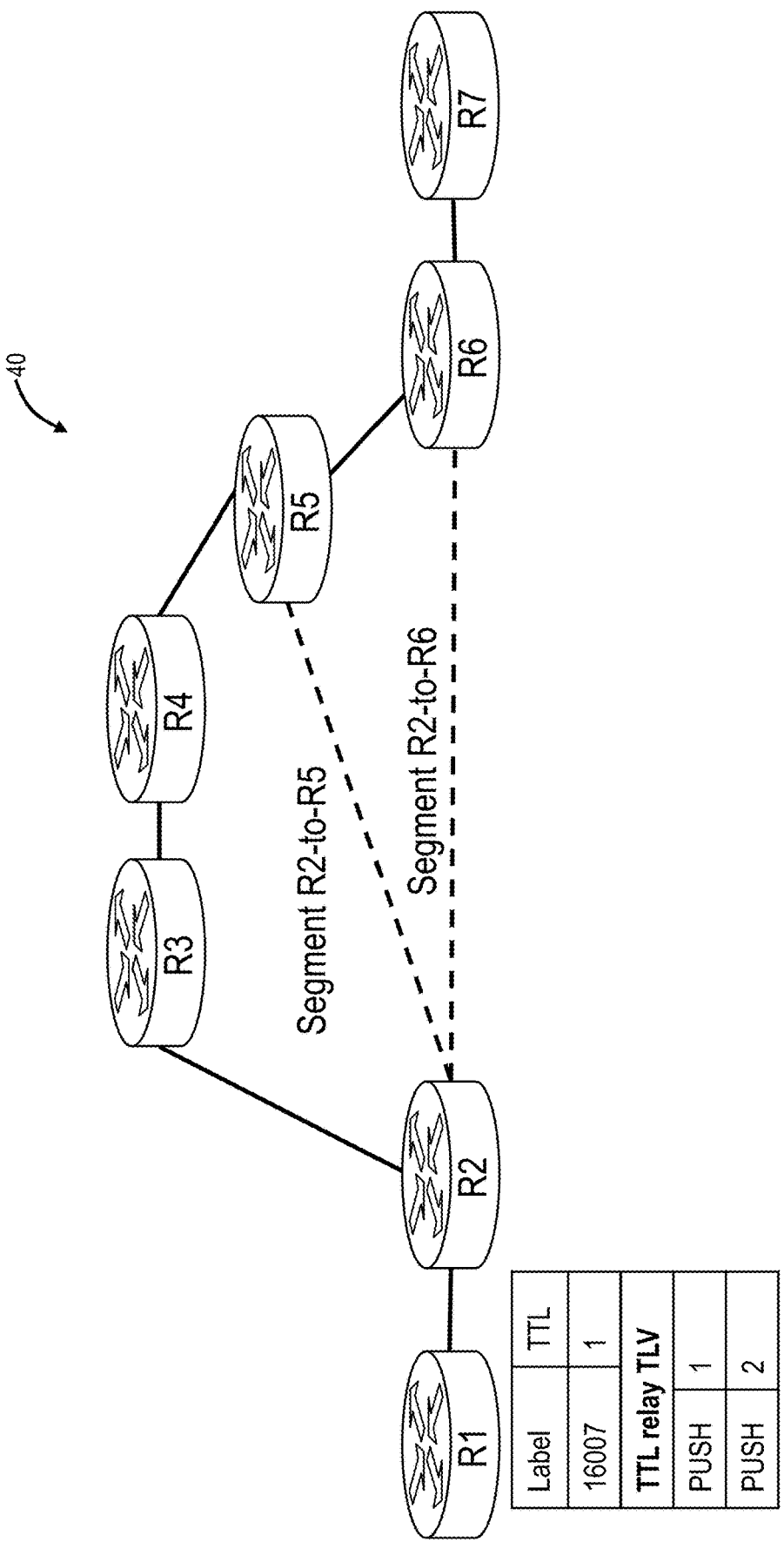

FIG. 18 illustrates hop 3 handling. Here, the hop 2 is omitted to simply FIG. 18. The hop 3 handling is a similar procedure for hop 2, with the difference being the last TTL value setting in the TTL relay TLV. The node R1 builds an MPLS echo request packet with top header TTL=1, and TTL relay TLV with the list of Push TTL=1 for tunnel R2-R6, Push TTL=2 for tunnel R2-R5 (value 1 is used for hop 2 handling, not shown in FIG. 18).

Figure 19:
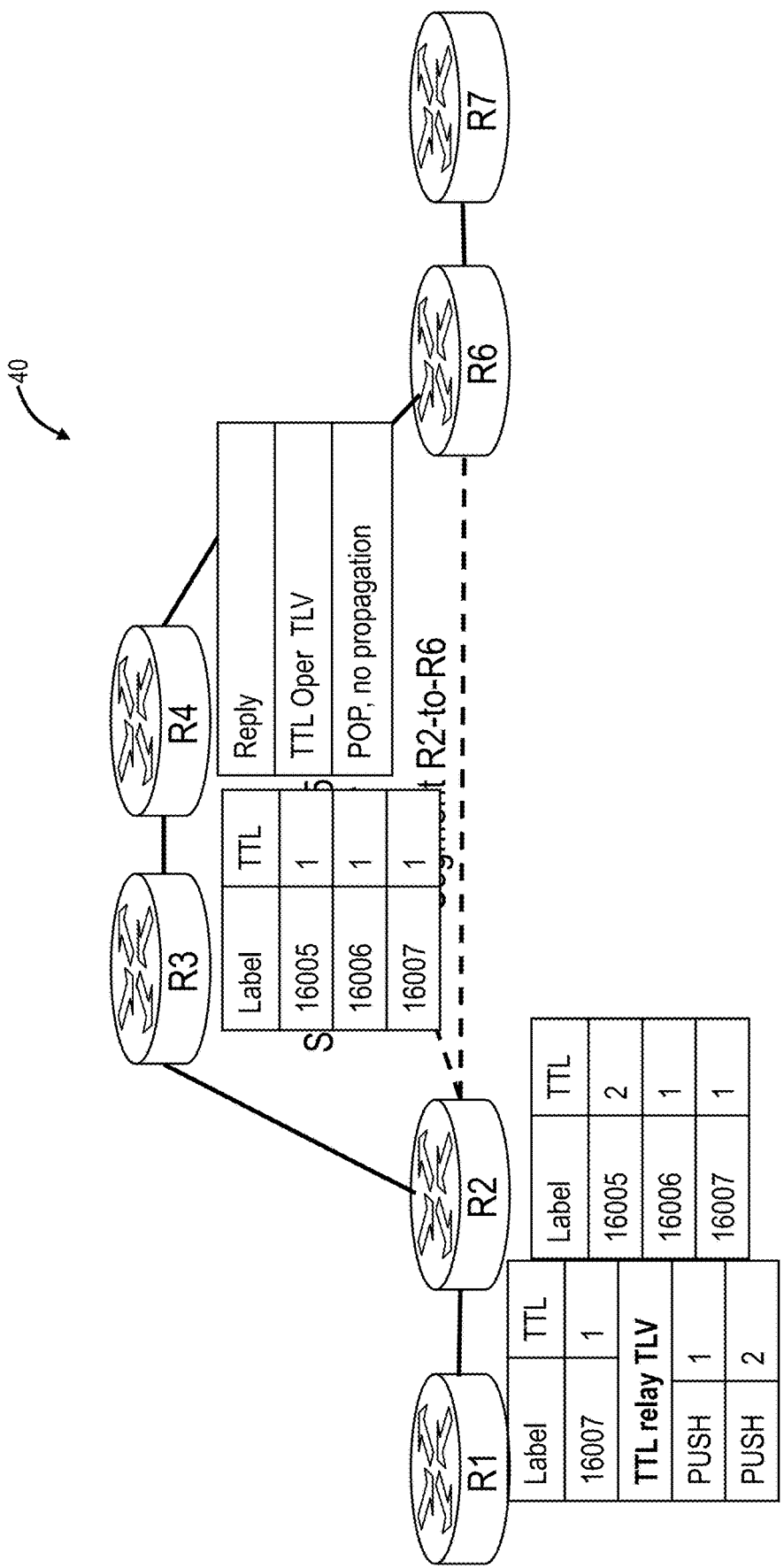

FIG. 19 continues the hop 3 handling after the node R1. On receiving the packet due to TTL expiry, the node R2 pops the first TTL relay TLV item with value 1 and sets it as the TTL for the pushed label 16006 (of tunnel R2-R6), then it pops the second item with value 2, and uses it as the TTL for the next pushed label 16005 (of tunnel R2-R5). The node R2 relays the packet by putting the modified packet in the data path to continue forward. The node R3 transparently forwards the packet to the node R4. The node R4 receives the packet due to TTL expiry and replies to the node R1 with a TTL operation POP without propagation.

Figure 20:
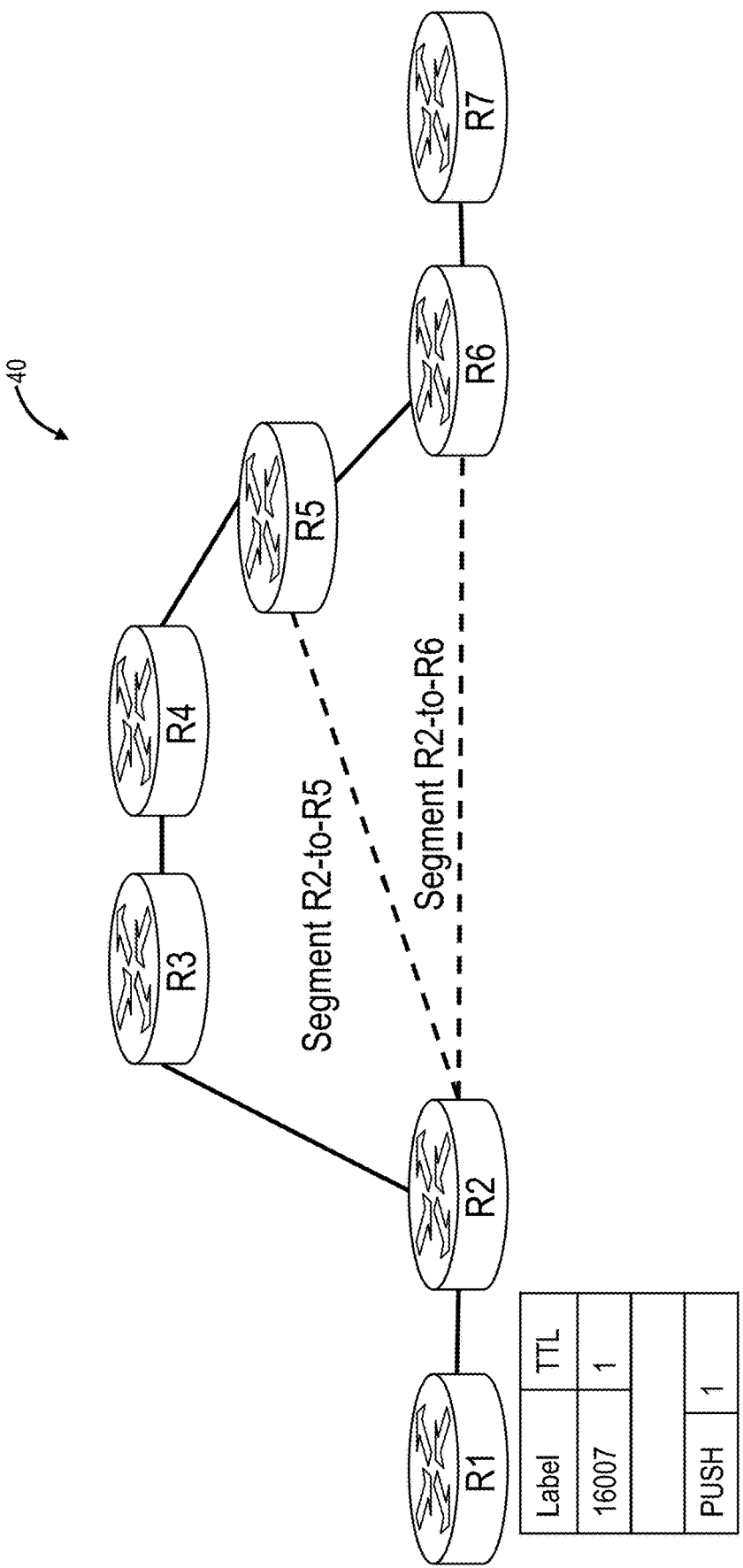

FIG. 20 illustrates hop 4 handling on the node R1. The hop 4 handling is as in hop 2 and hop 3, with the difference being the last TTL value setting in the TTL relay TLV. On receiving a POP without TTL propagation TTL operation TLV, the node R1 removes one TTL relay TLV item from the bottom, builds an MPLS echo request packet with top header TTL=1, and TTL relay TLV with a list of Push TTL=1 for tunnel R2-R6.

Figure 21:
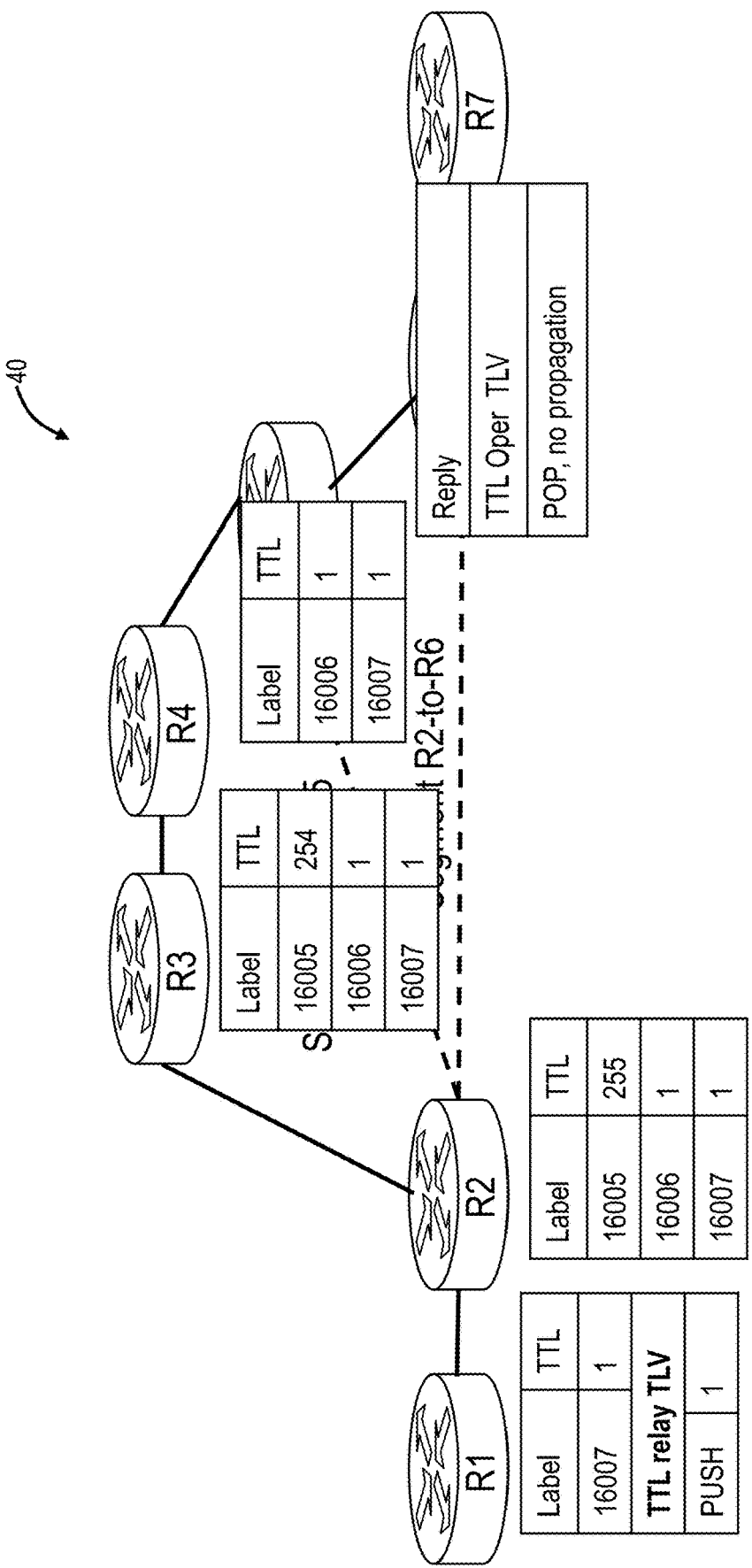

FIG. 21 illustrates the hop 4 handling after the node R1. On receiving the packet due to TTL expiry, the node R2 pops the first TTL relay TLV item with value 1 and sets it as the TTL for the pushed label 16006 (of tunnel R2-R6), then it pops the second item with value 2 since there are no more items in the TTL relay TLV, the node R2 uses the data path default TTL (255 for example) for tunnel label 16005 of R2-R5. The node R2 relays the packet by putting the modified packet in the data path to continue forward. The node R3 transparently forwards the packet to the node R4. The node R4 receives the packet pop top label and continues forward in the data path. The node R5 receives the packet due to TTL expiry and replies to the node R1 with TTL operation POP without propagation.

Figure 22:
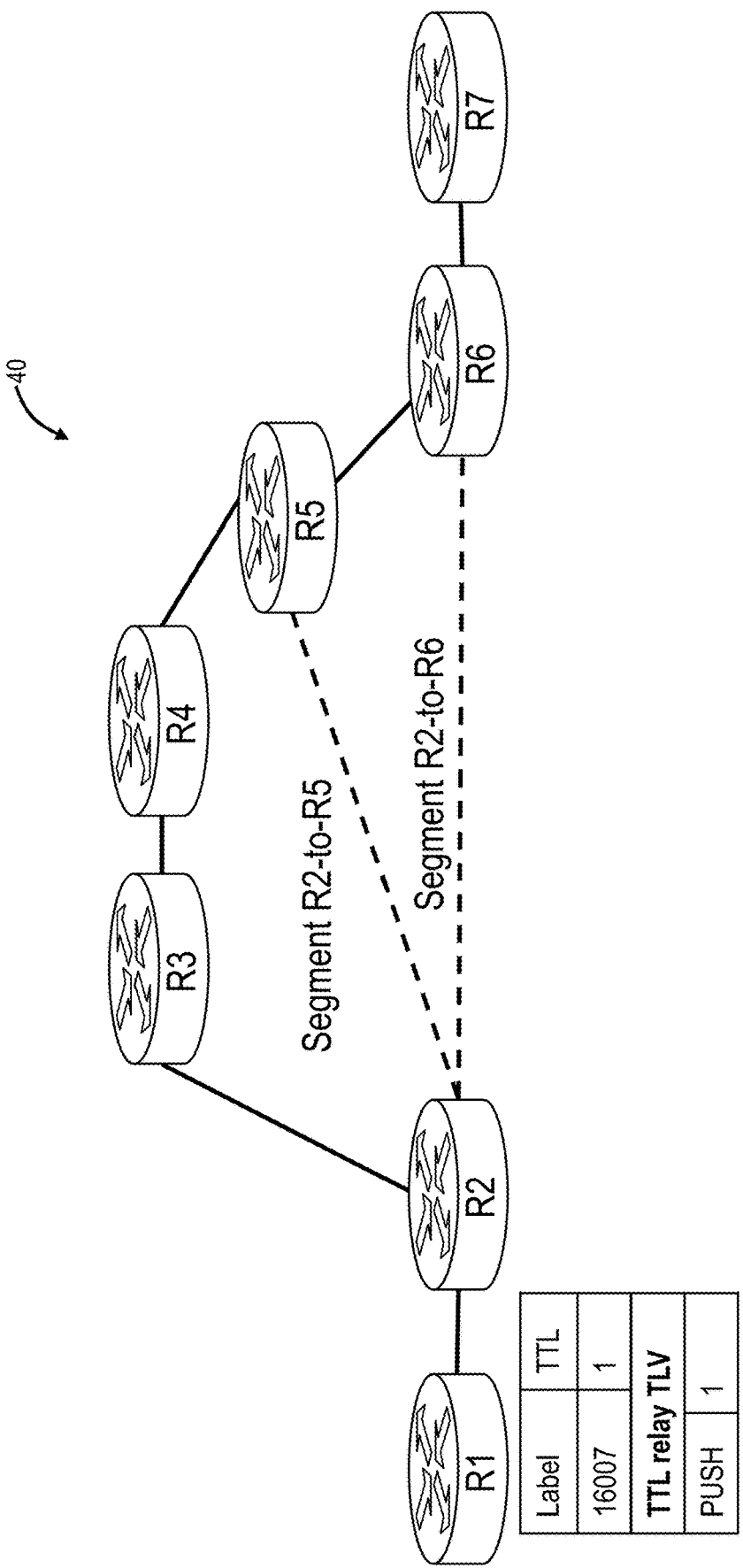

FIG. 22 illustrates the hop 5 handling on the node R1. On receiving the POP without TTL propagation TTL operation TLV, the node R1 removes the last TTL relay TLV item and builds an MPLS echo request packet with top header TTL increased to 2.

Figure 23:
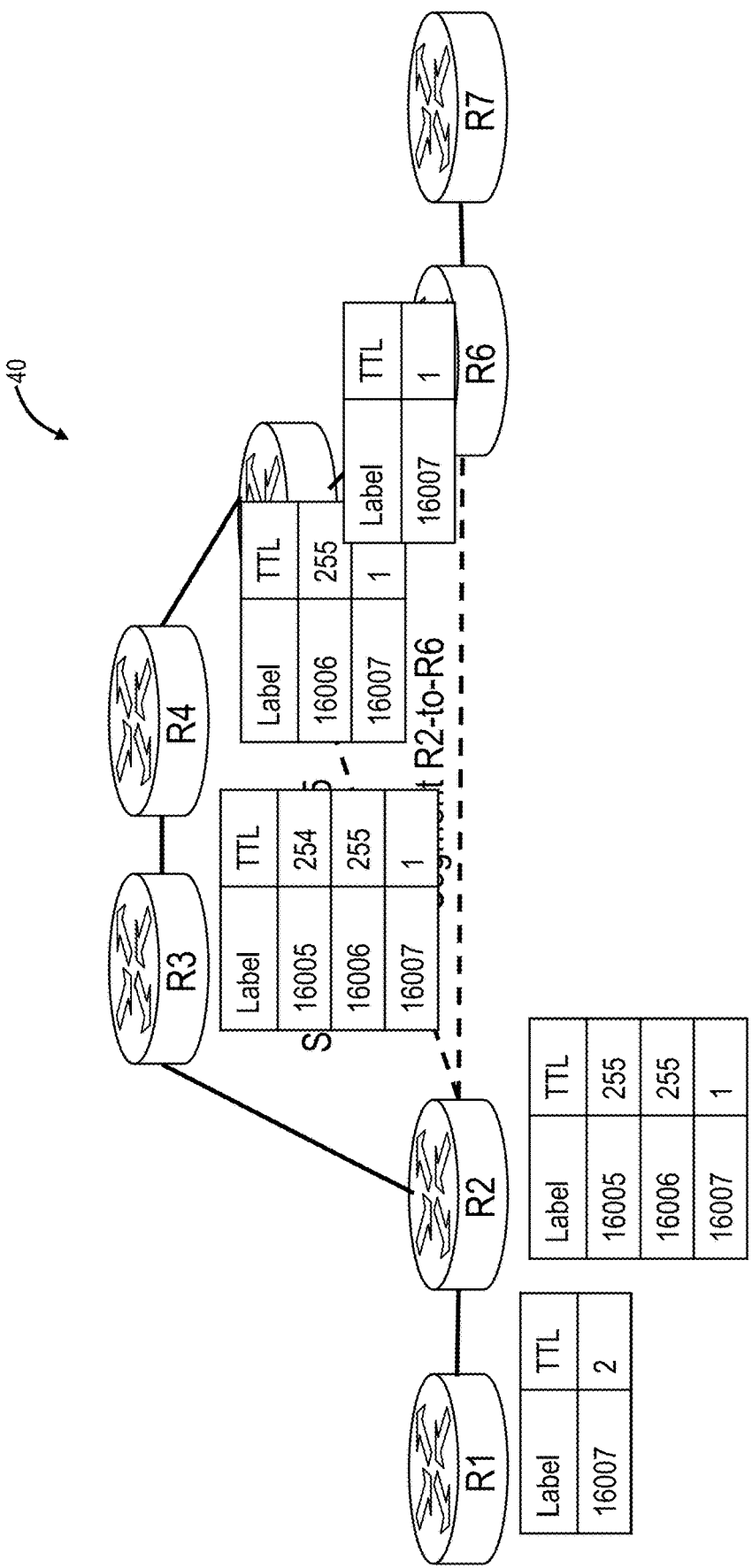

FIG. 23 illustrates the hop 5 handling after the node R1. The node R2 data path decreases the top label's TTL value to 1 and uses the data path default TTL (255 for example) for tunnel label 16006 of R2-R6 and tunnel label 16005 of R2-R5 to forward the packet. The node R2 relays the packet by putting the modified packet to the data path to continue forward. The node R3 transparently forwards the packet to the node R4. The node R4 receives the packet, pops the top label, and continues forward by data path. The node R5 receives the packet, pops the top label, and continues forward by data path. The node R6 receives the packet due to TTL expiry and replies to the node R1 to complete the processing of hop 5.

Interoperability

For support, the nodes R1-Rx need to support the data structure, e.g., TLV. However, nodes that do not enter or leave a tunnel do not need to support the TLV. When the initiator does not support this feature, and if it receives the TTL operation TLV, up to it is up to a local implementation strategy, it can either ignore the error and continue to the next hop router or stop and report the error. As of today, most vendors select to ignore this kind of error and continue.

In the case of R1-R2==R3==R4==R5-R6, where the node R2 enters a tunnel to the node R5 via the nodes R3 and R4, and it does not support this feature, the TLV will not be sent to the node R1, so as if nothing happened, the node R1 increases TTL to 2 and it reaches the node R5, no there is no interop concern. In the same case, if the node R4 does not support this feature when it receives a TTL relay TLV, as defined in RFC 8029, a return code 2 (one or more of the TLVs was not understood) will be returned to the initiator, because the node R1 is the initiator, when it detected any router along the path do not support a feature, it can select either ignore the error or fall back to automatically/manually disable the impacted new feature and retry. This is a generic strategy for inter-op issues, and it applies to this feature too. If the node R1 local implementation ignores the error and continues to request the node R2 to relay one step further, which will get the same error from the same node R2, and the node R1 can treat this as a signal to stop the operation, or the node R1 can rely on the max TTL configuration to stop the operation.

This feature only impacts tunnel/segment edge routers which do not support TTL propagation. All other routers still use hardware to forward the passthrough traffic. This feature gives the capability to trace into these impacted tunnels/segments.

Relay Node Process

Figure 24:
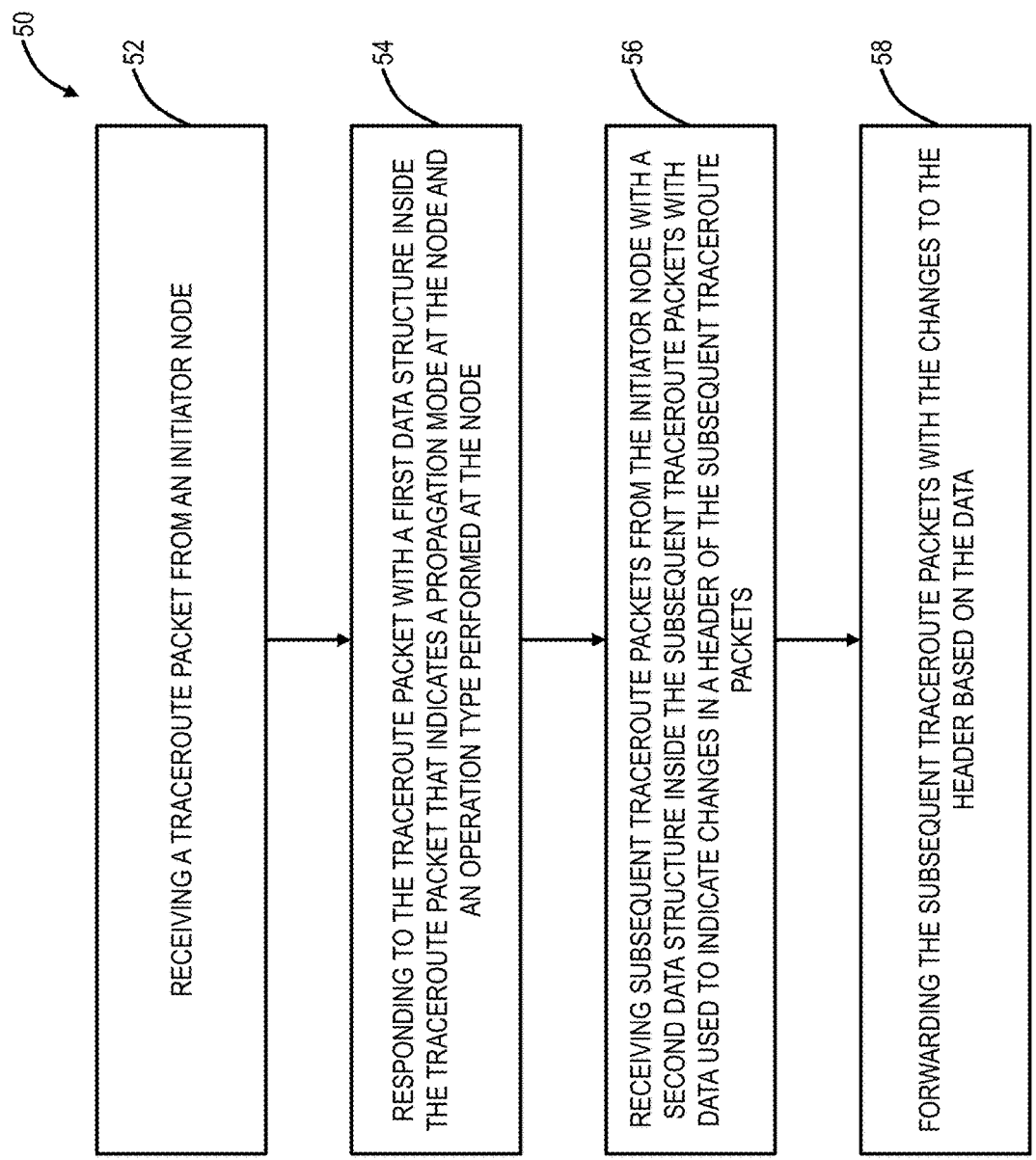
FIG. 24 is a flowchart of a process implemented at a relay node in a network.

FIG. 24 is a flowchart of a process 50 implemented at a relay node in a network, such as the networks 20, 30, 40. The process 50 can be implemented as a method, via circuitry at the node for performing operations, and as instructions embodied in a non-transitory computer-readable medium. The process 50 includes receiving a traceroute packet from an initiator node (step 52), responding to the traceroute packet with a first data structure inside the traceroute packet that indicates a propagation mode at the node and an operation type performed at the node (step 54), receiving subsequent traceroute packets from the initiator node with a second data structure inside the subsequent traceroute packets with data used to indicate changes in a header of the subsequent traceroute packets (step 56), and forwarding the subsequent traceroute packets with the changes to the header based on the data (step 58).

The propagation mode can be one of a uniform mode, a pipe mode, and a short pipe mode, and wherein the operation type is one of pop and push. The changes can include one of a change of a Time-to-Live (TTL) value in the header and a change of a Hop Limit value in the header. The data structure can be a Type-Length-Value (TLV). In an embodiment, the network utilizes Multiprotocol Label Switching (MPLS), the changes are to Time-to-Live (TTL) value in the header, and the node is connected to a tunnel or segment in the network. In another embodiment, the network utilizes Segment Routing (SR), the changes are to Hop Limit value in the header, and the node is connected to a portion of the network utilizing encapsulation and decapsulation. In a further embodiment, the network utilizes Internet Protocol (IP), the changes are to Hop Limit value in the header, and the node is connected to a portion of the network utilizing encapsulation and decapsulation.

Initiator Node Process

Figure 25:
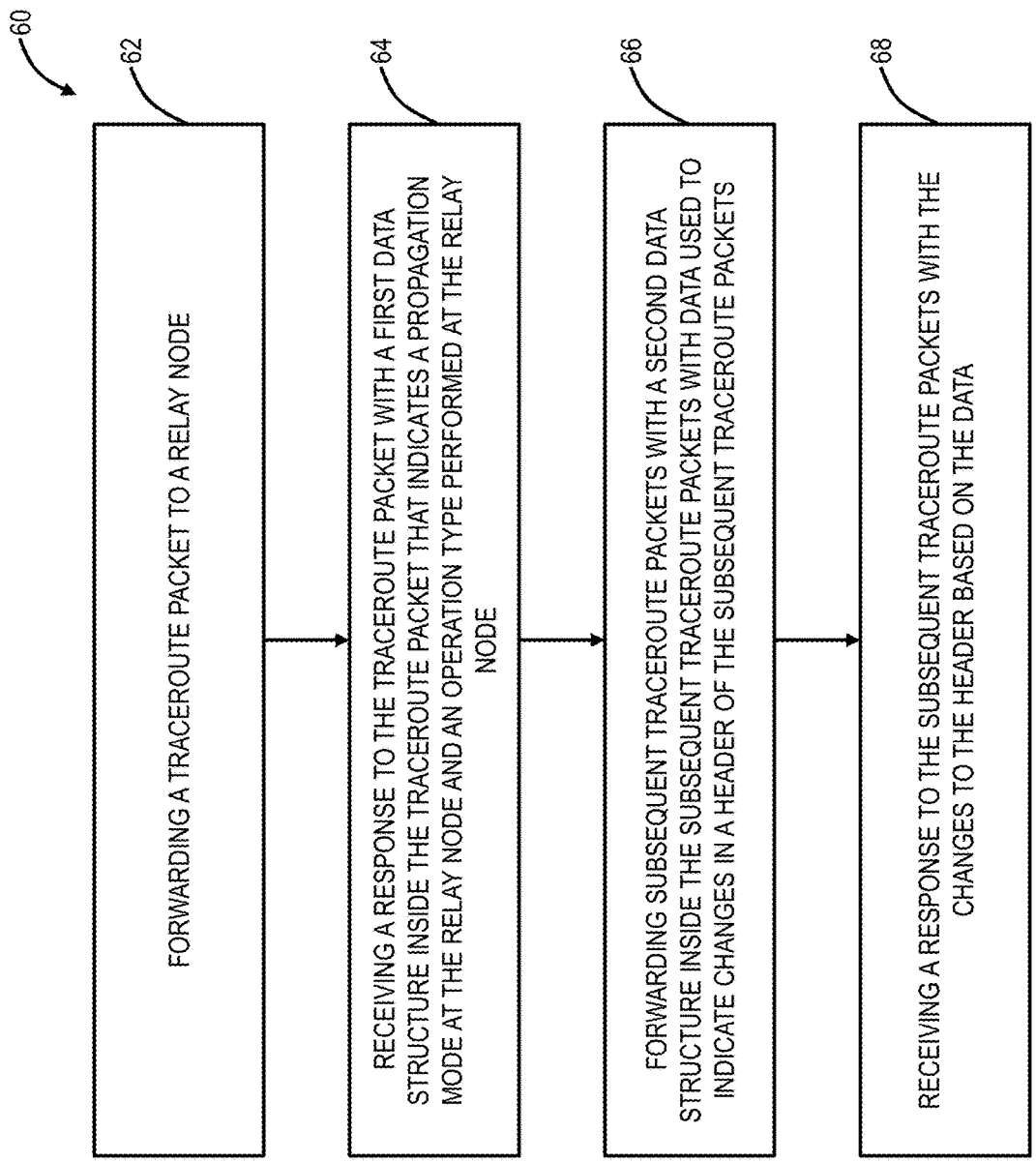
FIG. 25 is a flowchart of a process implemented at an initiator node in a network.

FIG. 25 is a flowchart of a process 60 implemented at an initiator node in a network, such as the networks 20, 30, 40. The process 60 can be implemented as a method, via circuitry at the node for performing operations, and as instructions embodied in a non-transitory computer-readable medium. The process 60 includes forwarding a traceroute packet to a relay node (step 62), receiving a response to the traceroute packet with a first data structure inside the traceroute packet that indicates a propagation mode at the relay node and an operation type performed at the relay node (step 64), forwarding subsequent traceroute packets with a second data structure inside the subsequent traceroute packets with data used to indicate changes in a header of the subsequent traceroute packets (step 66), and receiving a response to the subsequent traceroute packets with the changes to the header based on the data (step 68).

The propagation mode can be one of a uniform mode, a pipe mode, and a short pipe mode, and wherein the operation type is one of pop and push. The changes can include one of a change of a Time-to-Live (TTL) value in the header and a change of a Hop Limit value in the header. The data structure can be a Type-Length-Value (TLV).

In an embodiment, the network utilizes Multiprotocol Label Switching (MPLS), the changes are to Time-to-Live (TTL) value in the header, and the node is connected to a tunnel or segment in the network. In another embodiment, the network utilizes Segment Routing (SR), the changes are to Hop Limit value in the header, and the node is connected to a portion of the network utilizing encapsulation and decapsulation. In a further embodiment, the network utilizes Internet Protocol (IP), the changes are to Hop Limit value in the header, and the node is connected to a portion of the network utilizing encapsulation and decapsulation.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node in a network comprising circuitry configured to:
receive a traceroute packet from an initiator node,
respond to the traceroute packet with a first data structure, which is a first Type-Length-Value (TLV), inside a different traceroute packet that indicates a propagation mode at the node and an operation type performed at the node, wherein the first TLV indicates the node is connected to a tunnel or segment,
receive subsequent traceroute packets from the initiator node with a second data structure, which is a second TLV, inside the subsequent traceroute packets with data used to indicate changes in a header of the subsequent traceroute packets, wherein the second TLV include a change of a Hop Limit value in the header due to TTL expiry because the node is connected to the tunnel or segment, for tracing in the tunnel or segment, and
forward the subsequent traceroute packets with the changes to the header based on the data.

2. The node of claim 1, wherein the propagation mode is one of a uniform mode, a pipe mode, and a short pipe mode, and wherein the operation type is one of pop and push.

3. The node of claim 1, wherein the changes include a change of a Hop Limit value in the header.

4. The node of claim 1, wherein the network utilizes Segment Routing (SR), the changes are to Hop Limit value in the header, and the node is connected to a portion of the network utilizing encapsulation and decapsulation.

5. The node of claim 1, wherein the network utilizes Internet Protocol (IP), the changes are to Hop Limit value in the header, and the node is connected to a portion of the network utilizing encapsulation and decapsulation.

6. The node of claim 1, wherein the node is configured to implement the changes to the header based on the data where the node is an intermediate node in a forwarding path and the changes are not made at the initiator node.

7. An initiator node in a network comprising circuitry configured to:
forward a traceroute packet to a relay node,
receive a response to the traceroute packet with a first data structure, which is a first Type-Length-Value (TLV), inside a different traceroute packet that indicates a propagation mode at the relay node and an operation type performed at the relay node, wherein the first TLV indicates the relay node is connected to a tunnel or segment, forward subsequent traceroute packets with a second data structure, which is a second TLV, inside the subsequent traceroute packets with data used to indicate changes in a header of the subsequent traceroute packets, wherein the second TLV include a change of a Hop Limit value in the header due to TTL expiry because the node is connected to the tunnel or segment, for tracing in the tunnel or segment, and receive a response to the subsequent traceroute packets with the changes to the header based on the data.

8. The initiator node of claim 7, wherein the propagation mode is one of a uniform mode, a pipe mode, and a short pipe mode, and wherein the operation type is one of pop and push.

9. The initiator node of claim 7, wherein the changes include a change of a Hop Limit value in the header.

10. The initiator node of claim 7, wherein the network utilizes Segment Routing (SR), the changes are to Hop Limit value in the header, and the node is connected to a portion of the network utilizing encapsulation and decapsulation.

11. The initiator node of claim 7, wherein the network utilizes Internet Protocol (IP), the changes are to Hop Limit value in the header, and the node is connected to a portion of the network utilizing encapsulation and decapsulation.

12. The initiator node of claim 7, wherein the circuitry is further configured to forward a second traceroute packet to a second relay node, the second relay node does not support responding with the first data structure or processing of the second data structure, and receive and ignore an error from the second relay node.

13. The initiator node of claim 7, wherein the circuitry is further configured to receive the first data structure from a plurality of nodes along a forwarding path, such that the initiator node is aware of a local propagation node at each of the plurality of nodes.

14. A method implemented in a network, comprising:

receiving a traceroute packet at a relay node;

responding to the traceroute packet with a first data structure, which is s first Type-Length-Value (TLV), inside a different traceroute packet that indicates a propagation mode at the relay node and an operation type performed at the relay node, wherein the first TLV indicates the relay node is connected to a tunnel or segment, receiving subsequent traceroute packets with a second data structure, which is a second TLV, inside the subsequent traceroute packets with data used to indicate changes in a header of the subsequent traceroute packets, wherein the second TLV include a change of a Hop Limit value in the header due to TTL expiry because the relay node is connected to the tunnel or segment, for tracing in the tunnel or segment, and forwarding the subsequent traceroute packets with the changes to the header based on the data.

15. The method of claim 14, further comprising utilizing the first data structure to determine the changes in the header of the subsequent traceroute packets.

16. The method of claim 14, wherein the propagation mode is one of a uniform mode, a pipe mode, and a short pipe mode, and wherein the operation type is one of pop and push.

17. The method of claim 14, wherein the network utilizes Segment Routing (SR), the changes are to Hop Limit value in the header, and the relay node is connected to a portion of the network utilizing encapsulation and decapsulation.

18. The method of claim 14, wherein the network utilizes Internet Protocol (IP), the changes are to Hop Limit value in the header, and the relay node is connected to a portion of the network utilizing encapsulation and decapsulation.

19. The method of claim 14, further comprising receiving a second traceroute packet at a second relay node, the second relay node does not support responding with the first data structure or processing of the second data structure and responds with an error that is ignored.

\* \* \* \* \*